(12) United States Patent
Libster et al.

(10) Patent No.: US 12,181,811 B2
(45) Date of Patent: Dec. 31, 2024

(54) INTERMEDIATE TRANSFER MEMBER AND METHOD OF PRODUCTION THEREOF

(71) Applicant: Hewlett-Packard Development Company, L.P., Spring, TX (US)

(72) Inventors: Dima Libster, Nes Ziona (IL); Jacob Ben-Yakar, Nes Ziona (IL); Danny Feldman, Nes Ziona (IL); Sergey Inotaev, Nes Ziona (IL); Gabi Habibi, Nes Ziona (IL); Dafna Shunary, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 521 days.

(21) Appl. No.: 17/635,802

(22) PCT Filed: Apr. 1, 2020

(86) PCT No.: PCT/US2020/026145
§ 371 (c)(1),
(2) Date: Feb. 16, 2022

(87) PCT Pub. No.: WO2021/201860
PCT Pub. Date: Oct. 7, 2021

(65) Prior Publication Data
US 2022/0390880 A1    Dec. 8, 2022

(51) Int. Cl.
*G03G 15/16*    (2006.01)
*C08G 77/18*    (2006.01)

(52) U.S. Cl.
CPC ........... *G03G 15/162* (2013.01); *C08G 77/18* (2013.01)

(58) Field of Classification Search
CPC ...... G03G 15/162; G03G 15/10; C08G 77/18; C09D 183/04
See application file for complete search history.

(56) References Cited

U.S. PATENT DOCUMENTS

| 5,672,428 A | 9/1997 | Muschelewicz et al. |
| 6,020,412 A | 2/2000 | Muschelewicz et al. |
| (Continued) | | |

FOREIGN PATENT DOCUMENTS

| JP | 5636958 | 12/2014 |
| JP | 2015120902 | 7/2015 |
| (Continued) | | |

OTHER PUBLICATIONS

Witucki, A Silane Primer: Chemistry and Applications of Alkoxy Silanes, Journal of Coatings Technology 65(822), Jul. 1993, 5 pages.

*Primary Examiner* — Stewart A Fraser
(74) *Attorney, Agent, or Firm* — HP Inc. Patent Department

(57) ABSTRACT

There is described an intermediate transfer member for digital offset printing, comprising: a cured silicone release layer formed by curing a curable silicone release formulation comprising: a polyalkylsiloxane containing at least two vinyl groups having a weight average molecular weight of 60,000 g/mol or less; a polyalkylsiloxane containing two vinyl groups having a weight average molecular weight of at least 65,000 g/mol; a polyalkylsiloxane cross-linker containing at least two Si—H bonds; and a catalyst or a photoinitiator. There is also described a method of producing an intermediate transfer member, and a curable silicone release formulation for an intermediate transfer member.

15 Claims, 3 Drawing Sheets

(56) References Cited

U.S. PATENT DOCUMENTS

| | | |
|---|---|---|
| 2006/0280957 A1 | 12/2006 | Lee et al. |
| 2008/0280037 A1 | 11/2008 | Sheridan et al. |
| 2013/0164038 A1* | 6/2013 | Kusaba .............. G03G 15/0818 |
| | | 428/447 |
| 2016/0207306 A1 | 7/2016 | Landa et al. |
| 2020/0125009 A1* | 4/2020 | Azzam .................. C08G 77/20 |
| 2022/0050406 A1* | 2/2022 | Libster ................ C08K 5/5435 |

FOREIGN PATENT DOCUMENTS

| | | |
|---|---|---|
| WO | 2012/166870 A1 | 12/2012 |
| WO | 2016066232 | 5/2016 |
| WO | 2018006956 | 1/2018 |
| WO | 2019072398 | 4/2019 |
| WO | 2019074541 | 4/2019 |
| WO | 2019203849 | 10/2019 |
| WO | 2020/232629 A1 | 11/2020 |
| WO | 2021/031185 A1 | 2/2021 |

* cited by examiner

INTERMEDIATE TRANSFER MEMBER AND METHOD OF PRODUCTION THEREOF

Digital offset printing apparatus typically include an intermediate transfer member (ITM) onto which an image is applied prior to transferring the image to a substrate. Current intermediate transfer members comprise a silicone release layer as the surface layer onto which the ink image is applied. Conventionally, silicone release layers are formed either by condensation curing or thermally assisted addition curing reactions.

DETAILED DESCRIPTION

Figure 1:
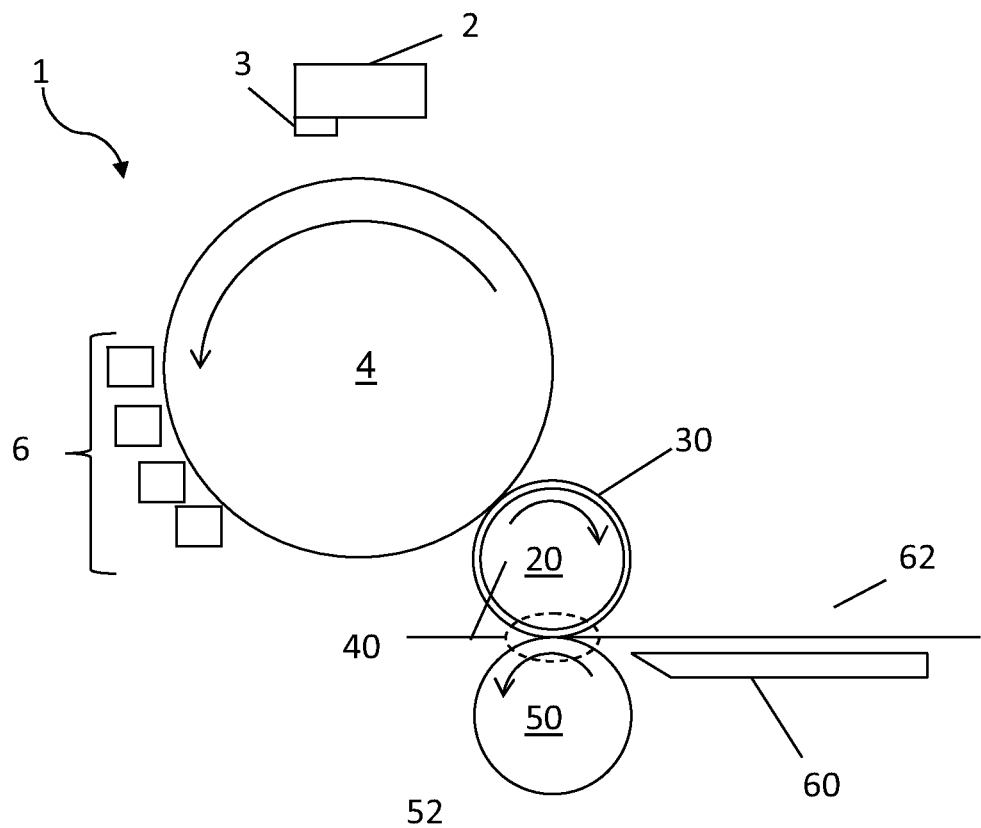
FIG. 1 is a schematic illustration of an example of a digital offset printing apparatus, in this case, a liquid electrophotographic printing apparatus.

Before the intermediate transfer member and related aspects are disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a", "an", and "the" include plural referents unless the context clearly dictates otherwise.

As used herein, "UV-A light" or "UV-A radiation" refers to electromagnetic radiation having a wavelength in the range of about 315 nm to about 410 nm, for example about 320 nm to about 410 nm, about 340 nm to about 410 nm, about 340 nm to about 400 nm, about 360 nm to about 410 nm, about 365 nm to about 405 nm, about 365 to about 400 nm, or about 395 nm. The term "UV-A source" refers to is a source of UV-A radiation, for example UV-LED.

As used herein, "UV-A photoinitiator" refers to a photoinitiator or photo-catalyst that is activatable on exposure to "UV-A radiation". Such UV-A photoinitiators are available commercially, an example is QPI-3100™ (available from Polymer-G, Israel) which is designed for curing under UV-A with a wavelength of 395 nm (UV-LED at 395 nm).

As used herein, the abbreviation "acac" refers to acetylacetonate.

As used herein, "electrophotographic ink composition" generally refers to an ink composition that is typically suitable for use in an electrophotographic printing process, sometimes termed an electrostatic printing process. The electrophotographic ink composition may include chargeable particles of the resin and the pigment dispersed in a liquid carrier, which may be as described herein.

The LEP inks referred to herein may comprise a colourant and a thermoplastic resin dispersed in a carrier liquid. In some examples, the thermoplastic resin may comprise an ethylene acrylic acid resin, an ethylene methacrylic acid resin or combinations thereof. In some examples, the electrostatic ink also comprises a charge director and/or a charge adjuvant. In some examples, the liquid electrostatic inks described herein may be ElectroInk® and any other Liquid Electro Photographic (LEP) inks developed by Hewlett-Packard Company.

As used herein, "liquid carrier", "carrier liquid", "carrier," or "carrier vehicle" refers to the fluid in which resin, pigment, charge directors and/or other additives can be dispersed to form a liquid electrostatic ink or electrophotographic ink. The carrier liquid may include a mixture of a variety of different agents, such as surfactants, co-solvents, viscosity modifiers, and/or other possible ingredients. The carrier liquid can include or be a hydrocarbon, silicone oil, vegetable oil, and so forth. The carrier liquid can include, for example, an insulating, non-polar, non-aqueous liquid that can be used as a medium for the first and second resin components. The carrier liquid can include compounds that have a resistivity in excess of about $10^9$ ohm·cm. The carrier liquid may have a dielectric constant below about 5, in some examples below about 3. The carrier liquid may include hydrocarbons. In some examples, the carrier liquid comprises or consists of, for example, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION).

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

Unless otherwise stated, viscosity was measured using an AR-2000 model Rheometer from TAI (Thermal Analysis Instruments). The rheometer is used as a viscometer, by applying shear forces on the testing sample between two parallel plates. The sample is loaded between parallel plates at a known gap with an oscillatory (sinusoidal) shear profile of from 0.01 to 1,000 $s^{-1}$ at a temperature of 25° C. applied.

As used herein, "electrophotographic printing" or "electrostatic printing" generally refers to the process that provides an image that is transferred from a photoimaging plate either directly, or indirectly via an intermediate transfer member, to a print substrate. As such, the image is not substantially absorbed into the photoimaging plate on which it is applied. Additionally, "electrophotographic printers", "electrophotographic printing apparatus", "electrostatic printing apparatus" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g., an electric field having a field gradient of 1,000 V/cm or more, or in some examples, 1500 V/cm or more.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such a list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt. % to about 5 wt. %" should be interpreted to include not only the explicitly recited values of about 1 wt. % to about 5 wt. %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In an aspect, there is provided an intermediate transfer member for digital offset printing. The intermediate transfer member for digital offset printing may comprise:
  a cured silicone release layer formed by curing a curable silicone release formulation comprising:
    a polyalkylsiloxane containing at least two vinyl groups having a weight average molecular weight of 60,000 g/mol or less;
    a polyalkylsiloxane containing two vinyl groups having a weight average molecular weight of at least 65,000 g/mol;
    a polyalkylsiloxane cross-linker containing at least two Si—H bonds; and a catalyst or a photoinitiator.

In another aspect, there is provided a method of producing an intermediate transfer member for digital offset printing. The method of producing an intermediate transfer member for digital offset printing may comprising:
  applying onto an intermediate transfer member body a curable silicone release formulation;
  curing the curable silicone release formulation to form a cured silicone release layer;
  wherein the curable silicone release formulation comprises:
    a polyalkylsiloxane containing at least two vinyl groups having a weight average molecular weight of 60,000 g/mol or less;
    a polyalkylsiloxane containing two vinyl groups having a weight average molecular weight of at least 65,000 g/mol;
    a polyalkylsiloxane cross-linker containing at least two Si—H bonds; and a catalyst or a photoinitiator.

In a further aspect, there is provided a curable release formulation for an intermediate transfer member of a digital offset printing apparatus. The curable release formulation for an intermediate transfer member of a digital offset printing apparatus, comprising:
  a polyalkylsiloxane containing at least two vinyl groups having a weight average molecular weight of 60,000 g/mol or less;
  a polyalkylsiloxane containing two vinyl groups having a weight average molecular weight of at least 65,000 g/mol;
  a polyalkylsiloxane cross-linker containing at least two Si—H bonds; and
  a catalyst or a photoinitiator.

In digital offset printing, for example, liquid electrophotographic (LEP) printing, the cured silicone release layer of intermediate transfer members is chemically and thermally degraded due to continuous exposure to carrier liquids (such as hydrocarbons) and repeated heating and cooling cycles throughout the printing process. Additionally, it is believed that during the transfer of LEP ink compositions from the photoimaging plate to the intermediate transfer member the release surface is damaged due to the formation of plasma during this transfer of ink. As a result, the transfer of ink from the intermediate transfer member to the substrate deteriorates over time, reducing the print quality and necessitating the replacement of the intermediate transfer member (ITM) blanket. The main damage to the ITM blanket occurs to the release layer that forms the surface of the ITM. However, once this damage occurs, the entire ITM blanket, which cannot be recycled, must be replaced. The incorporation of a higher weight average molecular weight polyalkylsiloxane (for example, with a weight average molecular weight of at least 65,000 g/mol) has now been shown to avoid or at least mitigate at least one of these problems. Additionally, the presence of this high weight average molecular weight polyalkylsiloxane has been found not to significantly deteriorate the mechanical properties of the release layer.

Digital Offset Printing Apparatus

In some examples, the digital offset printing apparatus may be any digital offset printing apparatus comprising an intermediate transfer member. In some examples, the digital offset printing apparatus may be a transfer inkjet printing apparatus or an electrostatic printing apparatus, for example, a dry toner electrostatic printing apparatus or a liquid electrostatic printing apparatus. In some examples, a transfer inkjet printing apparatus is an inkjet printing apparatus in which the ink is jetted onto an intermediate transfer member to form an image on the intermediate transfer member before the image is transferred from the intermediate transfer member to a substrate. In some examples, the digital offset printing apparatus is a liquid electrostatic (LEP) printing apparatus.

FIG. 1 shows a schematic illustration of an example of an LEP printing apparatus 1 and the use of an intermediate transfer member therein. An image, including any combination of graphics, text and images, is communicated to the LEP printing apparatus 1. The LEP printing apparatus includes a photo charging unit 2 and a photo-imaging cylinder 4. The image is initially formed on a photoimaging plate (also known as a photoconductive member), in this case in the form of photo-imaging cylinder 4, before being transferred to a cured silicone release layer 30 of the intermediate transfer member (ITM) 20 which is in the form of a roller (first transfer, T1), and then from the cured silicone release layer 30 of the ITM 20 to a print substrate 62 (second transfer, T2).

According to an illustrative example, the initial image is formed on rotating a photo-imaging cylinder 4 by a photo charging unit 2. Firstly, the photo charging unit 2 deposits a uniform static charge on the photo-imaging cylinder 4 and then a laser imaging portion 3 of the photo charging unit 2 dissipates the static charges in selected portions of the image area on the photo-imaging cylinder 4 to leave a latent electrostatic image. The latent electrostatic image is an electrostatic charge pattern representing the image to be printed. Liquid electrophotographic ink is then transferred to the photo-imaging cylinder 4 by a binary ink developer (BID) unit 6. The BID unit 6 presents a uniform film of liquid electrophotographic ink to the photo-imaging cylinder 4. The liquid electrophotographic ink contains electrically charged pigment particles which, by virtue of an appropriate potential on the electrostatic image areas, are attracted to the latent electrostatic image on the photo-imaging cylinder 4. The liquid electrophotographic ink does not adhere to the uncharged, non-image areas and forms a developed toner image on the surface of the latent electrostatic image. The photo-imaging cylinder 4 then has a single colour ink image on its surface.

The developed toner image is then transferred from the photo-imaging cylinder 4 to a cured silicone release layer 30 of an ITM 20 by electrical forces. The image is then dried and fused on the cured silicone release layer 30 of the ITM 20 before being transferred from the release layer 30 of the ITM 20 to a print substrate 62 disposed on an impression cylinder 50. The process may then be repeated for each of the coloured ink layers to be included in the final image.

The image is transferred from a photo-imaging cylinder 4 to an ITM 20 by virtue of an appropriate potential applied between the photo-imaging cylinder 4 and the ITM 20, such that the charged ink is attracted to the ITM 20.

Between the first and second transfers, the solid content of the developed toner image is increased and the ink is fused on to the ITM 20. For example, the solid content of the developed toner image deposited on the cured silicone release layer 30 after the first transfer is typically around 20%, by the second transfer the solid content of the developed toner image is typically around 80-90%. This drying and fusing is typically achieved by using elevated temperatures and airflow-assisted drying. In some examples, the ITM 20 is heatable.

The print substrate 62 is fed into the printing apparatus by a print substrate feed tray 60 and is disposed on an impression cylinder 50. As the print substrate 62 contacts the ITM 20, the single colour image is transferred to the print substrate 62.

To form a single colour image (such as a black and white image), one pass of the print substrate 62 through the impression cylinder 50 and the ITM 20 completes the image. For a multiple colour image, the print substrate 62 may be retained on the impression cylinder 50 and make multiple contacts with the ITM 20 as it passes through the nip 40. At each contact an additional colour plane may be placed on the print substrate 62.

Intermediate Transfer Member

The intermediate transfer member may be termed an ITM herein for brevity.

The intermediate transfer member for digital offset printing may comprise a cured silicone release layer formed by curing a curable silicone release formulation comprising a polyalkylsiloxane containing two vinyl groups having a weight average molecular weight of at least 65,000 g/mol; a polyalkylsiloxane cross-linker containing at least two Si—H bonds; and a catalyst or a photoinitiator. In some examples, the intermediate transfer member for digital offset printing may comprise a cured silicone release layer formed by curing a curable silicone release formulation comprising a polyalkylsiloxane containing at least two vinyl groups having a weight average molecular weight of 60,000 g/mol or less; a polyalkylsiloxane containing two vinyl groups having a weight average molecular weight of at least 65,000 g/mol; a polyalkylsiloxane cross-linker containing at least two Si—H bonds; and a catalyst or a photoinitiator.

The ITM may comprise a supportive portion on which the cured silicone release layer is disposed. The supportive portion may be termed an intermediate transfer member body herein.

The ITM may have a base, for example, a metal base. The base may have a cylindrical shape. The base may form part of the supportive portion of the ITM.

The ITM may have a cylindrical shape; as such, the ITM may be suitable for use as a roller, for example, a roller in a digital offset printing apparatus.

The supportive portion of the ITM may comprise a layered structure disposed on the base of the ITM. The supportive portion may comprise a layer comprising a thermoplastic polyurethane.

The layered structure may comprise a compliant substrate layer, for example, a rubber layer or a layer comprising a thermoplastic polyurethane, on which the cured silicone release layer may be disposed. The compliant substrate layer may comprise a thermoplastic polyurethane layer or a rubber layer. The rubber layer may comprise an acrylic rubber (ACM), a nitrile rubber (NBR), a hydrogenated nitrile rubber (HNBR), a polyurethane elastomer (PU), an EPDM rubber (an ethylene propylene diene terpolymer), a fluorosilicone rubber (e.g., FMQ or FLS), a fluorocarbon rubber (e.g., FKM or FPM) or a perfluorocarbon rubber (e.g., FFKM).

The ITM may comprise a primer layer to facilitate bonding or joining of the curable silicone release layer to the compliant layer. The primer layer may form part of the supportive portion of the ITM, in some examples, the primer layer is disposed on the compliant substrate layer.

In some examples, the primer layer may comprise an organosilane, for example, an organosilane derived from an epoxysilane such as 3-glycidoxypropyltrimethoxysilane, a vinyl silane such as vinyltriethoxysilane or vinyltrimethoxysilane, an allyl silane, an acryloxysilane such as 3-methacryloxypropyltrimethoxysilane, or an unsaturated silane, and a catalyst such as a catalyst comprising titanium or platinum.

The primer layer may be formed from a curable primer layer. The curable primer layer may be applied to the compliant substrate layer of the supportive portion of the ITM before a curable silicone release formulation is applied to the supportive portion. The curable primer layer may comprise an organosilane and a catalyst, for example, a catalyst comprising titanium and/or a catalyst comprising platinum.

In some examples, the organosilane contained in the curable primer layer is selected from an epoxysilane, a vinyl silane, an allyl silane and an unsaturated silane.

The curable primer layer may comprise a first primer and a first catalyst, and a second primer and, in some examples, a second catalyst. The first primer and/or the second primer may comprise an organosilane. The organosilane may be selected from an epoxysilane, a vinyl silane, an allyl silane and an unsaturated silane.

In some examples, the first catalyst is a catalyst for catalysing a condensation cure reaction, for example, a catalyst comprising titanium. The first primer may be cured by a condensation reaction by the first catalyst. The second primer may be cured by a condensation reaction by the first catalyst.

In some examples, the second catalyst is a catalyst for catalysing an addition cure reaction.

The curable primer layer may be applied to the compliant layer as a composition containing the first and second primer and first and second catalyst.

In some examples the curable primer layer may be applied to the compliant layer as two separate compositions, one containing the first primer and first catalyst, the other containing the second primer and second catalyst. In some examples, the curable primer layer may be applied as two separate compositions, one containing the first primer (e.g., (3-glycidoxypropyl)trimethoxysilane and/or 3-methacryloxypropyltrimeth-oxysilane) and a photoinitiator (e.g., 2-hydroxy-2-methylpropiophenone), the other containing the second primer (e.g., (3-glycidoxypropyl)trimethoxysilane and/or vinyltri-methoxysilane or vinyltrethoxysilane) and a catalyst (e.g., titanium diisopropoxide bis-(acetylacetonate) and/or platinum divinyltetramethyldisiloxane).

In some examples, the ITM may comprise an adhesive layer for joining the compliant substrate layer to the base. The adhesive layer may be a fabric layer, for example, a woven or non-woven cotton, synthetic, combined natural and synthetic, or treated, for example, treated to have improved heat resistance, material.

The compliant substrate layer may be formed of a plurality of compliant layers. For example, the compliant substrate layer may comprise a compressible layer, a compliance layer and/or a conductive layer. A "conductive layer" may be a layer comprising electrically conductive particles. In some examples, any one or more of the plurality of compliant layers may comprise a thermoplastic polyurethane.

In some examples, the compressible layer is disposed on the base of the ITM. The compressible layer may be joined to the base of the ITM by the adhesive layer. A conductive layer may be disposed on the compressible layer. The compliance layer may then be disposed on the conductive layer, if present, or disposed on the compressible layer if no conductive layer is present. If the compressible layer and/or the compliance layer are partially conducting there may be no requirement for an additional conductive layer.

The compressible layer may have a large degree of compressibility. In some examples, the compressible layer may be 600 μm thick.

The compressible layer may comprise a thermoplastic polyurethane layer, a rubber layer which, for example, may comprise an acrylic rubber (ACM), a nitrile rubber (NBR), a hydrogenated nitrile rubber (HNBR), a polyurethane elastomer (PU), an EPDM rubber (an ethylene propylene diene terpolymer), or a fluorosilicone rubber (FLS). In some examples, the compressible layer may comprise carbon black to increase its thermal conductivity.

In some examples, the compressible layer includes small voids, which may be as a result of microspheres or blowing agents used in the formation of the compressible layer. In some examples, the small voids comprise about 40% to about 60% by volume of the compressible layer.

The compliance layer may comprise a thermoplastic polyurethane, a soft elastomeric material having a Shore A hardness value of less than about 65, or a Shore A hardness value of less than about 55 and greater than about 35, or a Shore A hardness value of between about 42 and about 45. In some examples, the compliance layer comprises a polyurethane, a thermoplastic polyurethane or an acrylic. Shore A hardness is determined by ASTM standard D2240.

In some examples, the compliance layer comprises an acrylic rubber (ACM), a nitrile rubber (NBR), a hydrogenated nitrile rubber (HNBR), a polyurethane elastomer (PU), an EPDM rubber (an ethylene propylene diene terpolymer), a fluorosilicone rubber (e.g., FMQ), a fluorocarbon rubber (e.g., FKM or FPM) or a perfluorocarbon rubber (e.g., FFKM). In some examples, the compliance layer comprises a thermoplastic polyurethane.

In an example, the compressible layer and the compliance layer are formed from the same material.

The conductive layer may comprise a rubber, for example, an acrylic rubber (ACM), a nitrile rubber (NBR), a hydrogenated nitrile rubber (HNBR), or an EPDM rubber (an ethylene propylene diene terpolymer), and one or more conductive materials, including but not limited to carbon black or metallic particles. In some examples, the conductive layer may comprise a thermoplastic polyurethane and one or more conductive materials, including but not limited to carbon black or metallic particles.

In some examples, the compressible layer and/or the compliance layer may be made to be partially conducting with the addition of conducting particles, for example, conductive carbon black, metal particles or metal fibres. In some examples, where the compressible layer and/or the compliance layer are partially conducting there may be no requirement for an additional conductive layer.

In some examples, the intermediate transfer member comprises, in the following order:
  a. a fabric layer;
  b. a compressible layer, which may have voids therein;
  c. a layer comprising electrically conductive particles;
  d. a compliant layer;
  e. a primer layer; and
  f. a cured silicone release layer.

Figure 2:
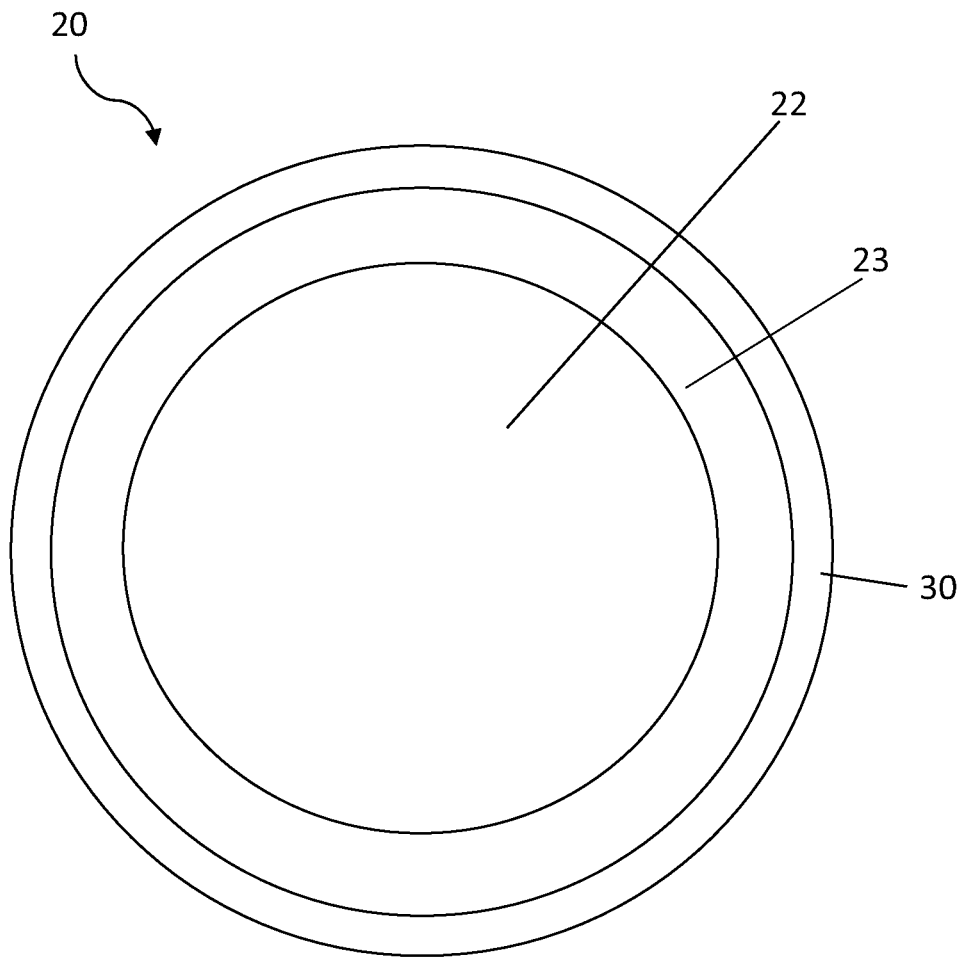
FIG. 2 is a schematic cross-sectional diagram of an example of an intermediate transfer member (ITM).

FIG. 2 is a cross-sectional diagram of an example of an ITM. The ITM includes a supportive portion comprising a base 22 and a substrate layer 23 disposed on the base 22. The base 22 may be a metal cylinder. The substrate layer 23 may comprise or be a thermoplastic polyurethane layer. The ITM 20 also comprises a cured silicone release layer 30 disposed on the substrate layer 23.

The substrate layer 23 may comprise or further comprise (if it also comprises a thermoplastic polyurethane layer) a rubber layer which may comprise an acrylic rubber (ACM), a nitrile rubber (NBR), a hydrogenated nitrile rubber (HNBR), a polyurethane elastomer (PU), an EPDM rubber (an ethylene propylene diene terpolymer), a fluorosilicone rubber (e.g., FMQ or FLS), a fluorocarbon rubber (e.g., FKM or FPM) or a perfluorocarbon rubber (e.g., FFKM). For example, the rubber layer may comprise an at least partly cured acrylic rubber, for example an acrylic rubber comprising a blend of acrylic resin Hi-Temp 4051 EP (Zeon Europe GmbH, Niederkasseler Lohweg 177, 40547 Dusseldorf, Germany) filled with carbon black pearls 130 (Cabot, Two Seaport Lane, Suite 1300, Boston, Mass. 02210, USA) and a curing system which may comprise, for example, NPC-50 accelerator (ammonium derivative from Zeon).

Figure 3:
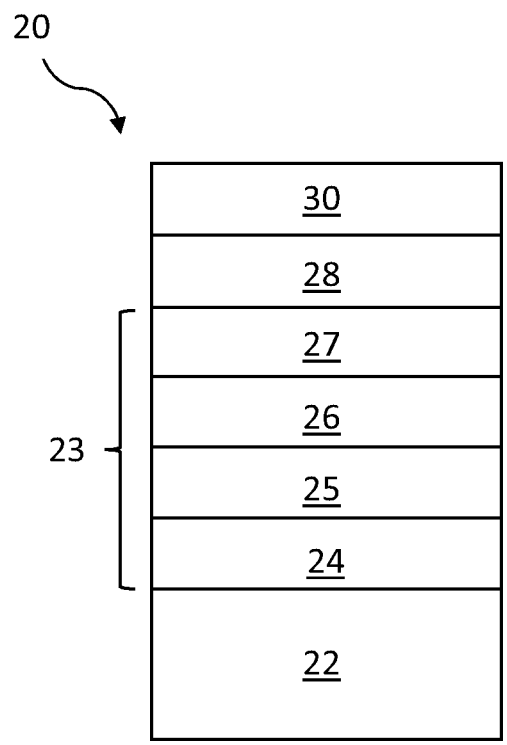
FIG. 3 is a schematic cross-sectional diagram of an example of an ITM structure.

FIG. 3 shows a cross-sectional view of an example of an ITM having a substrate layer 23 comprising an adhesive layer 24 disposed between the base 22 and a compressible layer 25 for joining the compressible layer 25 of the substrate layer 23 to the base 22, a conductive layer 26 may be disposed on the compressible layer 25, and a compliance layer 27 (also called a soft compliant layer) may be disposed on the conductive layer 26. A primer layer 28 is disposed between the substrate layer 23 and the cured silicone release layer 30. At least one of the layers 24 to 27 may comprise a thermoplastic polyurethane.

Figure 4:
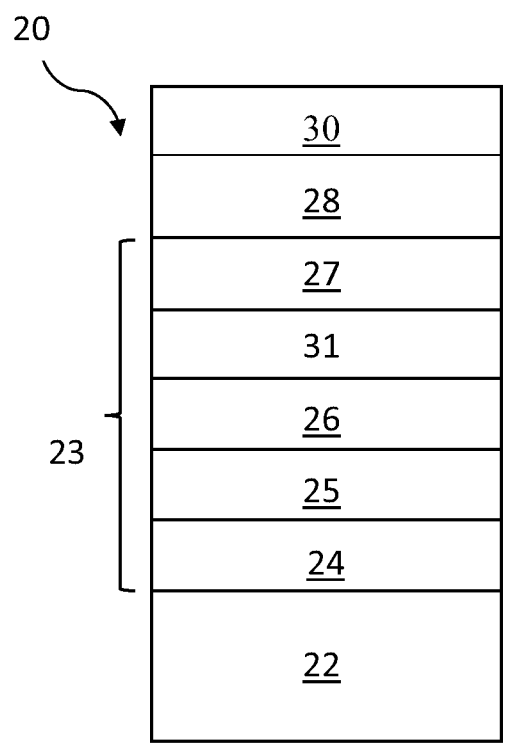
FIG. 4 is a schematic cross-sectional diagram of an example of an ITM structure.

FIG. 4 shows a cross-sectional view of an ITM having a substrate layer 23 comprising an adhesive layer 24 disposed between the base 22 and a compressible layer 25 for joining the compressible layer 25 of the substrate layer 23 to the base 22, a conductive layer 26 is disposed on the compressible layer 25, a layer comprising a thermoplastic polyurethane 31 is disposed on the conductive layer 26, and a compliance layer 27 (also called a soft compliant layer) is disposed on the conductive layer 26. The cured silicone release layer 30 is disposed on a primer layer 28, which is disposed on the compliance layer 27.

The adhesive layer may be a fabric layer, for example a woven or non-woven cotton, synthetic, combined natural and synthetic, or treated, for example, treated to have improved heat resistance, material. In an example the adhesive layer 23 is a fabric layer formed of NOMEX material having a thickness, for example, of about 200 µm.

The compressible layer 25 may be a rubber layer which, for example, may comprise an acrylic rubber (ACM), a nitrile rubber (NBR), a hydrogenated nitrile rubber (HNBR), a polyurethane elastomer (PU), an EPDM rubber (an ethylene propylene diene terpolymer), or a fluorosilicone rubber (FLS). The compressible layer may comprise a thermoplastic polyurethane.

The compliance layer 27 may comprise a soft elastomeric material having a Shore A hardness value of less than about 65, or a Shore A hardness value of less than about 55 and greater than about 35, or a Shore A hardness value of between about 42 and about 45. In some examples, the compliance layer 27 comprises a polyurethane or acrylic. In some examples, the compliance layer 27 comprises a thermoplastic polyurethane. Shore A hardness is determined by ASTM standard D2240. In some examples, the compliance layer comprises an acrylic rubber (ACM), a nitrile rubber (NBR), a hydrogenated nitrile rubber (HNBR), a polyurethane elastomer (PU), an EPDM rubber (an ethylene propylene diene terpolymer), a fluorosilicone rubber (e.g., FMQ), a fluorocarbon rubber (e.g., FKM or FPM) or a perfluorocarbon rubber (e.g., FFKM)

In an example, the compressible layer 25 and the compliance layer 27 are formed from the same material.

In some examples, the conductive layer 26 comprises a rubber, for example, an acrylic rubber (ACM), a nitrile rubber (NBR), a hydrogenated nitrile rubber (HNBR), or an EPDM rubber (an ethylene propylene diene terpolymer), and one or more conductive materials. In some examples, the conductive layer 26 comprises a thermoplastic polyurethane and one or more conductive materials. In some examples, the conductive layer 26 may be omitted, such as in some examples in which the compressible layer 25, the compliance layer 27, or the cured silicone release layer 30 are partially conducting. For example, the compressible layer 25 and/or the compliance layer 27 may be made to be partially conducting with the addition of conductive carbon black or metal fibres.

The primer layer 28 may be provided to facilitate bonding or joining of the release layer 30 to the substrate layer 23. The primer layer 28 may comprise an organosilane, for example, an organosilane derived from an epoxysilane such as 3-glycidylpropyl-trimethoxysilane, a vinyl silane such as vinyltriethoxysilane or vinyltrimethoxysilane, an allyl silane, an unsaturated silane or a (meth)acrylic silane, for example, 3-methacryloxypropyltrimethoxysilane, and a catalyst such as a catalyst comprising titanium or platinum.

In an example, a curable primer layer 28 is applied to a compliance layer 27 of a substrate layer 23, for example, to the outer surface of a compliance layer 27 made from an acrylic rubber. The curable primer may be applied using a rod coating process. The curable primer may comprise a first primer comprising an organosilane and a first catalyst comprising titanium, for example an organic titanate or a titanium chelate. In an example, the organosilane is an epoxysilane, for example, 3-glycidoxypropyl-trimethoxysilane (available from ABCR GmbH & Co. KG, Im Schlehert 10 D-76187, Karlsruhe, Germany, product code SIG5840) and vinyltriethoxysilane (VTEO, available from Evonik, Kirschenallee, Darmstadt, 64293, Germany), vinyltrimethoxysilane, an allyl silane, an unsaturated silane or a (meth) acrylic silane, for example, 3-methacryloxypropyltrimethoxysilane. The first primer is curable by, for example, a condensation reaction. For example, the first catalyst for a silane condensation reaction may be an organic titanate such as Tyzor® AA75 (available from Dorf-Ketal Chemicals India Private Limited Dorf Ketal Tower, D'Monte Street, Orlem, Malad (W), Mumbai-4,00064, Maharashtra, INDIA.). The primer may also comprise a second primer comprising an organosilane, for example, a vinyl siloxane, a vinyl silane, for example, vinyltriethoxysilane, vinyltrimethoxysilane, an allyl silane, an unsaturated silane or a (meth)acrylic silane, for example, 3-methacryloxypropyltrimethoxysilane, and, in some examples, a second catalyst. The second primer may also be curable by a condensation reaction. The second catalyst, if present, may be different from the first catalyst and in some examples comprises platinum or rhodium. For example, the second catalyst may be a Karstedt catalyst with, for example, 9 wt. % platinum in solution (available from Johnson Matthey, 5th Floor, 25 Farringdon Street, London EC4A 4AB, United Kingdom) or a SIP6831.2 catalyst (available from Gelest, 11 East Steel Road, Morrisville, Pa. 19067, USA). This second primer may be cured by an addition reaction. The second catalyst in the second primer may be in contact with a pre-cure curable silicone release formulation applied onto the primer layer 28.

The curable primer layer applied to the substrate layer 23 may comprise a first primer and/or a second primer as described herein. The curable primer layer may be applied to the substrate layer 23 as two separate layers, one layer containing the first primer and the other layer containing the second primer.

The rubbers of the compressible layer 25, the conductive layer 26 and/or the compliance layer 27 of the substrate layer 23 may be uncured when the curable primer layer is applied thereon.

The silicone release layer 30 of the ITM 20 may be a cured silicone release layer that is formed by curing a curable silicone release formulation as described herein.

The silicone release layer 30 may be formed on the ITM by applying a layer of the curable silicone release formulation to a supportive portion of the ITM. For example, the silicone release layer may be applied to the substrate layer 23 or on top of a curable primer layer which has already been applied to the substrate layer 23. The curable primer layer and the silicone release layer may have been cured at the same time.

In some examples, once cured, the ITM comprises a cured silicone release layer 30 disposed on a substrate layer 23, or, if present, disposed on a primer layer 28.

In some examples, the curable silicone release formulation forms a silicone polymer matrix on curing, thus forming the cured silicone release layer.

Curable Silicone Release Formulation

The curable silicone release formulation for an intermediate transfer member of a digital offset printing apparatus comprises a polyalkylsiloxane containing two vinyl groups having a weight average molecular weight of at least 65,000 g/mol; a polyalkylsiloxane cross-linker containing at least two Si—H bonds; and a catalyst or a photoinitiator. In some examples, the curable silicone release formulation for an intermediate transfer member of a digital offset printing apparatus comprises a polyalkylsiloxane containing at least two vinyl groups having a weight average molecular weight of 60,000 g/mol or less; a polyalkylsiloxane containing two vinyl groups having a molecular weight of at least 65,000 g/mol; a polyalkylsiloxane cross-linker containing at least two Si—H bonds; and a catalyst or a photoinitiator.

In some examples, the curable silicone release formulation further comprises conductive particles. In some examples, the curable silicone release formulation may comprise a polyalkylsiloxane containing at least two vinyl groups having a weight average molecular weight of 60,000 g/mol or less; a polyalkylsiloxane containing two vinyl groups having a weight average molecular weight of at least 65,000 g/mol; a polyalkylsiloxane cross-linker containing at least two Si—H bonds; a catalyst or a photoinitiator; and conductive particles.

In some examples, the curable silicone release formulation further comprises a thermal inhibitor. In some examples, the curable silicone release formulation may comprise a polyalkylsiloxane containing at least two vinyl groups having a weight average molecular weight of 60,000 g/mol or less; a polyalkylsiloxane containing two vinyl groups having a weight average molecular weight of at least 65,000 g/mol; a polyalkylsiloxane cross-linker containing at least two Si—H bonds; a catalyst or a photoinitiator; and a thermal inhibitor. the curable silicone release formulation may comprise a polyalkylsiloxane containing at least two vinyl groups having a weight average molecular weight of 60,000 g/mol or less; a polyalkylsiloxane containing two vinyl groups having a weight average molecular weight of at least 65,000 g/mol; a polyalkylsiloxane cross-linker containing at least two Si—H bonds; a catalyst or a photoinitiator; conductive particles; and a thermal inhibitor.

A weight average molecular weight of at least 65,000 g/mol may be referred to herein as a high molecular weight. A weight average molecular weight of 60,000 g/mol or less may be referred to herein as a low/medium molecular weight. A weight average molecular weight of 30,000 g/mol or less may be referred to herein as a low molecular weight. A weight average molecular weight of from 35,000 g/mol to 55,000 g/mol may be referred to herein as a medium molecular weight. In some examples, the weight average molecular weight may be measured by gel permeation chromatography/light scattering methods. In some examples, the weight average molecular weight of a polymer may be determined by ASTM D4001-13.

High Molecular Weight Polyalkylsiloxane

In some examples, the curable silicone release formulation comprises a polyalkylsiloxane containing two vinyl groups having a weight average molecular weight of at least 65,000 g/mol. In some examples, the polyalkylsiloxane containing two vinyl groups having a weight average molecular weight of at least 65,000 g/mol is selected from a linear polyalkylsiloxane containing two vinyl groups having a weight average molecular weight of at least 65,000 g/mol, a branched polyalkylsiloxane containing two vinyl groups having a weight average molecular weight of at least 65,000 g/mol, a cyclic polyalkylsiloxane containing two vinyl groups having a weight average molecular weight of at least 65,000 g/mol and mixtures thereof. In some examples, the polyalkylsiloxane containing two vinyl groups having a weight average molecular weight of at least 65,000 g/mol is a linear polyalkylsiloxane containing two vinyl groups having a weight average molecular weight of at least 65,000 g/mol.

In some examples, the vinyl groups in the polyalkylsiloxane containing two vinyl groups having a weight average molecular weight of at least 65,000 g/mol are selected from terminal vinyl groups, pendent vinyl groups and mixtures thereof. In some examples, the polyalkylsiloxane containing two vinyl groups having a weight average molecular weight of at least 65,000 g/mol is a vinyl-terminated polyalkylsiloxane having a weight average molecular weight of at least 65,000 g/mol.

In some examples, the polyalkylsiloxane, for example, the vinyl-terminated polyalkylsiloxane, having a weight average molecular weight of at least 65,000 g/mol has a weight average molecular weight of at least 70,000 g/mol, for example, at least 75,000 g/mol, at least 80,000 g/mol, at least 85,000 g/mol, at least 90,000 g/mol, at least 95,000 g/mol, at least 100,000 g/mol, at least 105,000 g/mol, at least 110,000 g/mol, at least 115,000 g/mol, at least 120,000 g/mol, at least 125,000 g/mol, at least 130,000 g/mol, at least 135,000 g/mol, at least 140,000 g/mol, at least 145,000 g/mol, at least 150,000 g/mol, at least 155,000 g/mol, at least 160,000 g/mol, at least 165,000 g/mol, or at least 170,000 g/mol. In some examples, the polyalkylsiloxane, for example, the vinyl-terminated polyalkylsiloxane, having a weight average molecular weight of at least 65,000 g/mol has a weight average molecular weight of up to 170,000 g/mol, for example, up to 165,000 g/mol, up to 160,000 g/mol, up to 155,000 g/mol, up to 150,000 g/mol, up to 145,000 g/mol, up to 140,000 g/mol, up to 135,000 g/mol, up to 130,000 g/mol, up to 125,000 g/mol, up to 120,000 g/mol, up to 115,000 g/mol, up to 110,000 g/mol, up to 105,000 g/mol, up to 100,000 g/mol, up to 95,000 g/mol, up to 90,000 g/mol, up to 85,000 g/mol, up to 80,000 g/mol, up to 75,000 g/mol, or up to 70,000 g/mol. In some examples, the polyalkylsiloxane, for example, the vinyl-terminated polyalkylsiloxane, having a weight average molecular weight of about 65,000 g/mol to about 170,000 g/mol, about 70,000 g/mol to about 165,000 g/mol, about 75,000 g/mol to about 160,000 g/mol, about 80,000 g/mol to about 155,000 g/mol, about 85,000 g/mol to about 150,000 g/mol, about 90,000 g/mol to about 145,000 g/mol, about 95,000 g/mol to about 140,000 g/mol, about 100,000 g/mol to about 135,000 g/mol, about 105,000 g/mol to about 130,000 g/mol, about 110,000 g/mol to about 125,000 g/mol, or about 110,000 g/mol to about 120,000 g/mol.

In some examples, the polyalkylsiloxane containing two vinyl groups having a weight average molecular weight of at least 65,000 g/mol comprises a vinyl-terminated polyalkylsiloxane having the following formula:

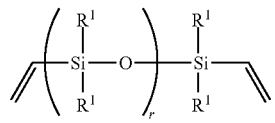

wherein each $R^1$ is independently selected from C1 to C6 alkyl; and r is an integer such that the weight average molecular weight of the polyalkylsiloxane is at least 65,000 g/mol. In some examples, r is any integer that provides a weight average molecular weight as described above.

In some examples, each $R^1$ is independently selected from C1, C2, C3, C4, C5 and C6 alkyl. In some examples, each $R^1$ is independently selected from methyl, ethyl, n-propyl, isopropyl, n-butyl, sec-butyl, isobutyl, tert-butyl, pentyl, 2-methylbutan-2-yl, 2,2-dimethylpropyl, 3-methylbutyl, pentan-2-yl, and pentan-3-yl. In some examples, each $R^1$ is independently selected from methyl, ethyl, n-propyl, isopropyl, n-butyl, sec-butyl, isobutyl, and tert-butyl. In some examples, each $R^1$ is independently selected from methyl, ethyl, n-propyl, and isopropyl. In some examples, each $R^1$ is the same. In some examples, each $R^1$ is methyl.

In some examples, the polyalkylsiloxane comprising two vinyl groups, for example, the vinyl-terminated polyalkylsiloxane, having a weight average molecular weight of at least 65,000 g/mol is present in the curable silicone release formulation in an amount of up to about 10 mol % based on the total number of moles of vinyl-containing polyalkylsiloxane compounds. In some examples, the polyalkylsiloxane, for example, the vinyl-terminated polyalkylsiloxane, having a weight average molecular weight of at least 65,000 g/mol is present in the curable silicone release formulation in an amount of up to about 9.5 mol %, for example, up to about 9 mol %, up to about 8.5 mol %, up to about 8 mol %, up to about 7.5 mol %, up to about 7 mol %, up to about 6.5 mol %, up to about 6 mol %, up to about 5.5 mol %, up to about 5 mol %, up to about 4.5 mol %, up to about 4 mol %, up to about 3.5 mol %, up to about 3 mol %, up to about 2.5 mol %, up to about 2 mol %, up to about 1.5 mol %, up to about 1 mol %, or up to about 0.5 mol % based on the total number of moles of vinyl-containing polyalkylsiloxane compounds. In some examples, the polyalkylsiloxane, for example, the vinyl-terminated polyalkylsiloxane, having a molecular weight of at least 65,000 g/mol is present in the curable silicone release formulation in an amount of at least about 0.5 mol %, for example, at least about 1 mol %, at least about 1.5 mol %, at least about 2 mol %, at least about 2.5 mol %, at least about 3 mol %, at least about 3.5 mol %, at least about 4 mol %, at least about 4.5 mol %, at least about 5 mol %, at least about 5.5 mol %, at least about 6 mol %, at least about 6.5 mol %, at least about 7 mol %, at least about 7.5 mol %, at least about 8 mol %, at least about 8.5 mol %, at least about 9 mol %, at least about 9.5 mol %, or at least about 10 mol % based on the total number of moles of vinyl-containing polyalkylsiloxane compounds. In some examples, the polyalkylsiloxane, for example, the vinyl-terminated polyalkylsiloxane, having a molecular weight of at least 65,000 is present in an amount of from about 0.5 mol % to about 10 mol %, for example, about 1 mol % to about 9.5 mol %, about 1.5 mol % to about 9 mol %, about 2 mol % to about 8.5 mol %, about 2.5 mol % to about 8 mol %, about 3 mol % to about 7.5 mol %, about 3.5 mol % to about 7 mol %, about 4 mol % to about 6.5 mol %, about 4.5 mol % to about 6 mol %, or about 5 mol % to about 5.5 mol % based on the total number of moles of vinyl-containing polyalkylsiloxane compounds.

In some examples, the polyalkylsiloxane comprising two vinyl groups, for example, the vinyl-terminated polyalkylsiloxane, having a weight average molecular weight of at least 65,000 g/mol is present in the curable silicone release formulation in an amount of up to about 50 wt. % of the total weight of vinyl-containing polyalkylsiloxane compounds. In some examples, the polyalkylsiloxane comprising two vinyl groups, for example, the vinyl-terminated polyalkylsiloxane, having a weight average molecular weight of at least 65,000 g/mol is present in the curable silicone release formulation in an amount of up to about up to about 45 wt. %, for example, up to about 40 wt. %, up to about 35 wt. %, up to about 30 wt. %, up to about 25 wt. %, up to about 20 wt. %, up to about 15 wt. %, up to about 10 wt. %, or up to about 5 wt. % based on the total weight of vinyl-containing polyalkylsiloxane compounds. In some examples, the polyalkylsiloxane comprising two vinyl groups, for example, the vinyl-terminated polyalkylsiloxane, having a weight average molecular weight of at least 65,000 g/mol is present in the curable silicone release formulation in an amount of at least about 5 wt. %, for example, at least about 10 wt. %, at least about 15 wt. %, at least about 20 wt. %, at least about 25 wt. %, at least about 30 wt. %, at least about 35 wt. %, at least about 40 wt. %, at least about 45 wt. %, or at least about 50 wt. % based on the total weight of vinyl-containing polyalkylsiloxane compounds.

Suitable examples of the polyalkylsiloxane comprising two vinyl groups having a molecular weight of 65,000 g/mol or more include Polymer VS100000, Polymer VS20000, VS65000 and VS165000 from Evonik. Other suitable examples include DMS-V42 (72,000 g/mol), DMS-V43 (92,000 g/mol), DMS-V46 (117,000 g/mol), DMS-V51 (140,000 g/mol), and DMS-V52 (155,000 g/mol).

Low/Medium Molecular Weight Polyalkylsiloxane

In some examples, the curable silicone release formulation comprises a polyalkylsiloxane comprising at least two vinyl groups having a weight average molecular weight of 60,000 g/mol or less. In some examples, the polyalkylsiloxane comprising at least two vinyl groups having a weight average molecular weight of 60,000 g/mol or less is selected from a linear polyalkylsiloxane comprising at least two vinyl groups having a weight average molecular weight of 60,000 g/mol or less, a branched polyalkylsiloxane comprising at least two vinyl groups having a weight average molecular weight of 60,000 g/mol or less, a cyclic polyalkylsiloxane comprising at least two vinyl groups having a weight average molecular weight of 60,000 g/mol or less and mixtures thereof. In some examples, the polyalkylsiloxane comprising at least two vinyl groups having a weight average molecular weight of 60,000 g/mol or less is a linear polyalkylsiloxane comprising at least two vinyl groups having a weight average molecular weight of 60,000 g/mol or less.

In some examples, the polyalkylsiloxane having a weight average molecular weight of 60,000 g/mol or less has a weight average molecular weight of about 55,000 g/mol or less, for example, about 50,000 g/mol or less, about 45,000 g/mol or less, about 40,000 g/mol or less, about 35,000 g/mol or less, about 30,000 g/mol or less, about 25,000 g/mol or less, about 20,000 g/mol or less, about 15,000 g/mol or less, about 10,000 g/mol or less, or about 5,000 g/mol or less. In some examples, the polyalkylsiloxane having a weight average molecular weight of 60,000 g/mol or less has a weight average molecular weight of about 5,000 g/mol or more, about 10,000 g/mol or more, about 15,000 g/mol or more, about 20,000 g/mol or more, about 25,000 g/mol or more, about 30,000 g/mol or more, about 35,000 g/mol or more, about 40,000 g/mol or more, about 45,000 g/mol or more, about 50,000 g/mol or more, or about 55,000 g/mol or more. In some examples, the polyalkylsiloxane having a weight average molecular weight of 60,000 or less has a weight average molecular weight of from about 5,000 g/mol to about 60,000 g/mol, for example, about 10,000 g/mol to about 55,000 g/mol, about 15,000 g/mol to about 50,000 g/mol, about 20,000 g/mol to about 45,000 g/mol, about 25,000 g/mol to about 40,000 g/mol, about 30,000 g/mol to about 35,000 g/mol.

In some examples, the polyalkylsiloxane comprising at least two vinyl groups having a weight average molecular weight of 60,000 g/mol or less may comprise at least two vinyl groups, at least three vinyl groups, or at least four vinyl groups. In some examples, polyalkylsiloxane comprising at least two vinyl groups having a weight average molecular weight of 60,000 g/mol or less may comprise a polyalkylsiloxane comprising at least two vinyl groups having a weight average molecular weight of 30,000 g/mol or less. In some examples, polyalkylsiloxane comprising at least two vinyl groups having a weight average molecular weight of 60,000 g/mol or less may comprise a polyalkylsiloxane comprising two vinyl groups having a weight average molecular weight of 30,000 g/mol or less. In some examples, the polyalkylsiloxane comprising at least two vinyl groups having a weight average molecular weight of 60,000 g/mol or less may comprise a polyalkylsiloxane comprising at least two vinyl groups having a weight average molecular weight of 35,000 g/mol to 55,000 g/mol. In some examples, polyalkylsiloxane comprising at least two vinyl groups having a weight average molecular weight of 60,000 g/mol or less may comprise a polyalkylsiloxane comprising at least three vinyl groups having a weight average molecular weight of 35,000 g/mol to 55,000 g/mol.

In some examples, the vinyl groups in the polyalkylsiloxane comprising at least two vinyl groups having a weight average molecular weight of 60,000 g/mol or less are selected from terminal vinyl groups, pendent vinyl groups and mixtures thereof. In some example, the vinyl groups in the polyalkylsiloxane comprising two vinyl groups having a weight average molecular weight of 60,000 g/mol or less, for example, 30,000 g/mol or less, are terminal vinyl groups. In some examples, the vinyl groups in the polyalkylsiloxane comprising at least three vinyl groups having a weight average molecular weight of 60,000 g/mol or less, for example, 35,000 g/mol to 55,000 g/mol, are a mixture of terminal vinyl groups and pendent vinyl groups, for example, two terminal vinyl groups and at least one pendent vinyl group.

In some examples, the polyalkylsiloxane comprising at least two vinyl groups having a weight average molecular weight of 60,000 g/mol or less may comprise a mixture comprising a polyalkylsiloxane comprising two vinyl groups, for example, terminal vinyl groups, having a weight average molecular weight of 60,000 g/mol or less; and a polyalkylsiloxane comprising at least three vinyl groups, for example, two terminal vinyl groups and at least one pendent vinyl group, having a weight average molecular weight of 60,000 g/mol or less. In some examples, polyalkylsiloxane comprising at least two vinyl groups having a weight average molecular weight of 60,000 g/mol or less may comprise a mixture comprising polyalkylsiloxane comprising two vinyl groups, for example, terminal vinyl groups, having a weight average molecular weight of 30,000 g/mol or less; and a polyalkylsiloxane comprising at least three vinyl groups, for example, two terminal vinyl groups and at least one pendent vinyl group, having a weight average molecular weight of 35,000 g/mol to 55,000 g/mol.

In some examples, the polyalkylsiloxane comprising two vinyl groups, for example, terminal vinyl groups, having a weight average molecular weight of 30,000 g/mol may have a weight average molecular weight of from 5,000 g/mol to 30,000 g/mol, for example, about 5,000 g/mol to about 30,000 g/mol, about 6,000 g/mol to about 29,000 g/mol, about 7,000 g/mol to about 28,000 g/mol, about 8,000 g/mol to about 27,000 g/mol, about 9,000 g/mol to about 26,000 g/mol, about 10,000 g/mol to about 25,000 g/mol, about 11,000 g/mol to about 24,000 g/mol, about 12,000 g/mol to about 23,000 g/mol, about 13,000 g/mol to about 22,000 g/mol, about 14,000 g/mol to about 21,000 g/mol, about 15,000 g/mol to about 20,000 g/mol, about 16,000 g/mol to about 19,000 g/mol, or about 17,000 g/mol to about 18,000 g/mol.

In some examples, the polyalkylsiloxane comprising at least three vinyl groups, for example, two terminal vinyl groups and at least one pendent vinyl group, having a weight average molecular weight of from 35,000 g/mol to 55,000 g/mol, for example, about 36,000 g/mol to about 46,000 g/mol, about 37,000 g/mol to about 47,000 g/mol, about 38,000 g/mol to about 48,000 g/mol, about 39,000 g/mol to about 49,000 g/mol, about 40,000 g/mol to about 50,000 g/mol, about 41,000 g/mol to about 51,000 g/mol, about 42,000 g/mol to about 52,000 g/mol, about 43,000 g/mol to about 53,000 g/mol, about 44,000 g/mol to about 54,000 g/mol, or about 45,000 g/mol to about 55,000 g/mol.

In some examples, the polyalkylsiloxane containing two vinyl groups having a weight average molecular weight of 60,000 g/mol or less, for example, 30,000 g/mol or less comprises a vinyl-terminated polyalkylsiloxane having the following formula:

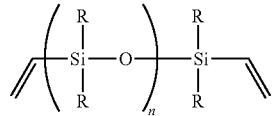

wherein each R is independently selected from C1 to C6 alkyl; and n is an integer such that the weight average molecular weight of the polyalkylsiloxane is 60,000 g/mol or less, for example, 30,000 g/mol or less. In some examples, n is any integer that provides a weight average molecular weight described above.

In some examples, each R is independently selected from C1, C2, C3, C4, C5 and C6 alkyl. In some examples, each R is independently selected from methyl, ethyl, n-propyl, isopropyl, n-butyl, sec-butyl, isobutyl, tert-butyl, pentyl, 2-methylbutan-2-yl, 2,2-dimethylpropyl, 3-methylbutyl, pentan-2-yl, and pentan-3-yl. In some examples, each R is independently selected from methyl, ethyl, n-propyl, isopropyl, n-butyl, sec-butyl, isobutyl, and tert-butyl. In some examples, each R is independently selected from methyl, ethyl, n-propyl, and isopropyl. In some examples, each R is the same. In some examples, each R is methyl.

In some examples, the vinyl-terminated polyalkylsiloxane having a weight average molecular weight of 60,000 g/mol or less, for example, 30,000 g/mol or less, has a dynamic viscosity at 25° C. of 250 mPa·s or more, in some examples, 300 mPa·s or more, in some examples, 350 mPa·s or more, in some examples, 400 mPa·s or more, in some examples, 450 mPa·s or more, in some examples, 500 mPa·s or more, in some examples, 550 mPa·s or more, in some examples 600 mPa·s or more, in some examples, 650 mPa·s or more, in some examples, 700 mPa·s or more, in some examples, about 750 mPa·s. In some examples, the vinyl-terminated polyalkylsiloxane having a weight average molecular weight of 60,000 g/mol or less, for example, 30,000 g/mol or less, has a dynamic viscosity at 25° C. or 750 mPa·s or less, in some examples, 700 mPa·s or less, in some examples, 650 mPa·s or less, in some examples, 600 mPa·s or less, in some examples, 550 mPa·s or less, in some examples, 500 mPa·s or less, in some examples, 450 mPa·s or less, in some examples, 400 mPa·s or less, in some examples, 350 mPa·s or less, in some examples, 300 mPa·s or less, in some examples, about 250 mPa·s. In some examples, the vinyl-terminated polyalkylsiloxane having a weight average molecular weight of 60,000 g/mol or less, for example, 30,000 g/mol or less, has a dynamic viscosity at 25° C. of 250 mPa·s to 750 mPa·s, in some examples, 300 mPa·s to 700 mPa·s, in some examples, 350 mPa·s to 650 mPa·s, in some examples, 400 mPa·s to 600 mPa·s, in some examples, 450 mPa·s to 550 mPa·s, in some examples, 450 mPa·s to 500 mPa·s.

In some examples, the vinyl-terminated polyalkylsiloxane having a weight average molecular weight of 60,000 g/mol or less, for example, 30,000 g/mol or less, may have a vinyl content of 0.05 mmol/g or more, in some examples, 0.06 mmol/g or more, in some examples, 0.07 mmol/g or more, in some examples, 0.08 mmol/g or more, in some examples, 0.09 mmol/g or more, in some examples, 0.1 mmol/g or more, in some examples, 0.11 mmol/g or more, in some examples, 0.12 mmol/g or more, in some examples, 0.13 mmol/g or more, in some examples, 0.14 mmol/g or more, in some examples, 0.15 mmol/g or more, in some examples, 0.16 mmol/g or more, in some examples, 0.17 mmol/g or more, in some examples, 0.18 mmol/g or more, in some examples, 0.19 mmol/g or more, in some examples, 0.2 mmol/g or more, in some examples, 0.3 mmol/g or more, in some examples, 0.4 mmol/g or more, in some examples, 0.5 mmol/g or more, in some examples, about 0.6 mmol/g. In some examples, the vinyl-terminated polyalkylsiloxane having a weight average molecular weight of 60,000 g/mol or less, for example, 30,000 g/mol or less, may have a vinyl content of 0.6 mmol/g or less, in some examples, 0.5 mmol/g or less, in some examples, 0.4 mmol/g or less, in some examples, 0.3 mmol/g or less, in some examples, 0.2 mmol/g or less, in some examples, 0.19 mmol/g or less, in some examples, 0.18 mmol/g or less, in some examples, 0.17 mmol/g or less, in some examples, 0.16 mmol/g or less, in some examples, 0.15 mmol/g or less, in some examples, 0.14 mmol/g or less, in some examples, 0.13 mmol/g or less, in some examples, 0.12 mmol/g or less, in some examples, 0.11 mmol/g or less, in some examples, 0.1 mmol/g or less, in some examples, 0.09 mmol/g or less, in some examples, 0.08 mmol/g or less, in some examples, 0.07 mmol/g or less, in some examples, 0.06 mmol/g or less, in some examples, about 0.05 mmol/g. In some examples, the vinyl-terminated polyalkylsiloxane having a weight average molecular weight of 60,000 g/mol or less, for example, 30,000 g/mol or less, may have a vinyl content of 0.05 mmol/g to 0.6 mmol/g, in some examples, 0.06 mmol/g to 0.5 mmol/g, in some examples, 0.07 mmol/g to 0.4 mmol/g, in some examples, 0.08 mmol/g to 0.3 mmol/g, in some examples, 0.09 mmol/g to 0.2 mmol/g, in some examples, 0.1 mmol/g to 0.19 mmol/g, in some examples, 0.11 mmol/g to 0.18 mmol/g, in some examples, 0.12 mmol/g to 0.17 mmol/g, in some examples, 0.13 mmol/g to 0.16 mmol/g, in some examples, 0.14 mmol/g to 0.15 mmol/g.

In some examples, the polyalkylsilxoane containing at least three vinyl groups having a weight average molecular weight of 60,000 g/mol or less, for example, from 35,000 g/mol to 55,000 g/mol, comprises a pendent vinyl polyalkylsiloxane having the following formula:

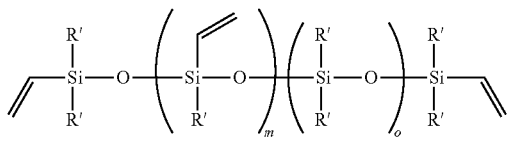

wherein each R' is independently selected from C1 to C6 alkyl; m is 1 or more; o is 0 or more; and (m+o) is an integer such that the weight average molecular weight of the polyalkylsiloxane is 60,000 g/mol or less, for example, from 35,000 g/mol to 55,000 g/mol. In some examples, (m+o) is any integer that provides a weight average molecular weight described above.

In some examples, each R' is independently selected from C1, C2, C3, C4, C5 and C6 alkyl. In some examples, each R' is independently selected from methyl, ethyl, n-propyl, isopropyl, n-butyl, sec-butyl, isobutyl, tert-butyl, pentyl, 2-methylbutan-2-yl, 2,2-dimethylpropyl, 3-methylbutyl, pentan-2-yl, and pentan-3-yl. In some examples, each R' is independently selected from methyl, ethyl, n-propyl, isopropyl, n-butyl, sec-butyl, isobutyl, and tert-butyl. In some examples, each R' is independently selected from methyl, ethyl, n-propyl, and isopropyl. In some examples, each R' is the same. In some examples, each R' is methyl.

In some examples, m is up to 50% of (m+o), for example, up to 45%, up to 40%, up to 35%, up to 30%, up to 25%, up to 20%, up to 15%, up to 10%, up to 9%, up to 8%, up to 7%, up to 6%, up to 5%, up to 4%, up to 3%, up to 2%, up to 1%, up to 0.5% of (m+o). In some examples, m is at least 0.5% of (m+o), for example, at least 1%, at least 2%, at least 3%, at least 4%, at least 5%, at least 6%, at least 7%, at least 8%, at least 9%, at least 10%, at least 15%, at least 20%, at least 25%, at least 30%, at least 35%, at least 40%, at least 45%, or at least 50% of (m+o). In some examples, m is from 0.5% of (m+o) to 50% of (m+o), for example, 1% to 45%, 2% to 40%, 3% to 35%, 4% to 30%, 5% to 25%, 6% to 20%, 7% to 15%, 8% to 10%, 0.5% to 9% of (m+o). In some examples, m is a proportion of (m+o) that provides a vinyl content of the pendent vinyl polyalkylsiloxane described herein.

In some examples, the pendent vinyl polyalkylsiloxane having a weight average molecular weight of 60,000 g/mol or less, for example, from 35,000 g/mol to 55,000 g/mol, has a dynamic viscosity at 25° C. of 2500 mPa·s or more, in some examples, 2550 mPa·s or more, in some examples, 2600 mPa·s or more, in some examples, 2650 mPa·s or more, in some examples, 2700 mPa·s or more, in some examples, 2750 mPa·s or more, in some examples, 2800 mPa·s or more, in some examples 2900 mPa·s or more, in some examples, 3000 mPa·s or more, in some examples, 3050 mPa·s or more, in some examples, 3100 mPa·s or more, in some examples, 3150 mPa·s or more, in some examples, 3200 mPa·s or more, in some examples, 3250 mPa·s or more, in some examples, 3300 mPa·s or more, in some examples, 3350 mPa·s or more, in some examples, 3400 mPa·s or more, in some examples, 3450 mPa·s or more, in some examples, about 3500 mPa·s. In some examples, the pendent vinyl polyalkylsiloxane having a weight average molecular weight of 60,000 g/mol or less, for example, from 35,000 g/mol to 55,000 g/mol, has a dynamic viscosity at 25° C. or 3500 mPa·s or less, in some examples, 3450 mPa·s or less, in some examples, 3400 mPa·s or less, in some examples, 3350 mPa·s or less, in some examples, 3300 mPa·s or less, in some examples, 3250 mPa·s or less, in some examples, 3200 mPa·s or less, in some examples, 3150 mPa·s or less, in some examples, 3100 mPa·s or less, in some examples, 3050 mPa·s or less, in some examples, 3000 mPa·s or less, in some examples, 2950 mPa·s or less, in some examples, 2900 mPa·s or less, in some examples, 2850 mPa·s or less, in some examples, 2800 mPa·s or less, in some examples, 2750 mPa·s or less, in some examples, 2700 mPa·s or less, in some examples, 2650 mPa·s or less, in some examples, about 2500 mPa·s. In some examples, the pendent vinyl polyalkylsiloxane having a weight average molecular weight of 60,000 g/mol or less, for example, from 35,000 g/mol to 55,000 g/mol, has a dynamic viscosity at 25° C. of 2500 mPa·s to 3500 mPa·s, in some examples, 2550 mPa·s to 3450 mPa·s, in some examples, 2600 mPa·s to 3400 mPa·s, in some examples, 2650 mPa·s to 3350 mPa·s, in some examples, 2700 mPa·s to 3300 mPa·s, in some examples, 2750 mPa·s to 3250 mPa·s, in some examples, 2800 mPa·s to 3200 mPa·s, in some examples, 2850 mPa·s to 3150 mPa·s, in some examples, 2900 mPa·s to 3100 mPa·s, in some examples, 2950 mPa·s to 3050 mPa·s, in some examples, 3000 mPa·s to 3050 mPa·s.

In some examples, the pendent vinyl polyalkylsiloxane having a weight average molecular weight of 60,000 g/mol or less, for example, from 35,000 g/mol to 55,000 g/mol, may have a vinyl content of 0.1 mmol/g or more, 0.2 mmol/g or more, in some examples, 0.3 mmol/g or more, in some examples, 0.4 mmol/g or more, in some examples, 0.5 mmol/g or more, in some examples, 0.6 mmol/g or more, in some examples, 0.7 mmol/g or more, in some examples, 0.8 mmol/g or more, in some examples, 0.9 mmol/g or more, in some examples, 1 mmol/g or more, in some examples, 2 mmol/g or more. In some examples, the vinyl-terminated polyalkylsiloxane having a weight average molecular weight of 60,000 g/mol or less, for example, from 35,000 g/mol to 55,000 g/mol, may have a vinyl content of 2 mmol/g or less, in some examples, 1 mmol/g or less, in some examples, 0.9 mmol/g or less, in some examples, 0.8 mmol/g or less, in some examples, 0.7 mmol/g or less, in some examples, 0.6 mmol/g or less, in some examples, 0.5 mmol/g or less, in some examples, 0.4 mmol/g or less, in some examples, 0.3 mmol/g or less, in some examples, 0.2 mmol/g or less, in some examples, 0.1 mmol/g or less. In some examples, the vinyl-terminated polyalkylsiloxane having a weight average molecular weight of 60,000 g/mol or less, for example, from 35,000 g/mol to 55,000 g/mol, may have a vinyl content of 0.1 mmol/g to 2 mmol/g, in some examples, 0.2 mmol/g to 1 mmol/g, in some examples, 0.3 mmol/g to 0.9 mmol/g, in some examples, 0.4 mmol/g to 0.8 mmol/g, in some examples, 0.5 mmol/g to 0.7 mmol/g, in some examples, 0.3 mmol/g to 0.6 mmol/g.

In some examples, the polyalkylsiloxane containing at least two vinyl groups having a weight average molecular weight of 60,000 g/mol or less comprises a mixture comprising a vinyl-terminated polyalkylsiloxane with a weight average molecular weight of 30,000 g/mol or less and a pendent vinyl polyalkylsiloxane with a weight average molecular weight of from about 35,000 g/mol to about 55,000 g/mol, wherein the vinyl-terminated polyalkylsiloxane with a weight average molecular weight of 30,000 g/mol or less has the following formula:

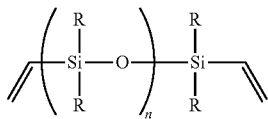

wherein each R is independently selected from C1 to C6 alkyl; and n is an integer such that the weight average molecular weight of the polyalkylsiloxane is 30,000 g/mol or less; and
wherein the pendent vinyl polyalkylsiloxane with a weight average molecular weight of from about 35,000 g/mol to about 55,000 g/mol has the following formula:

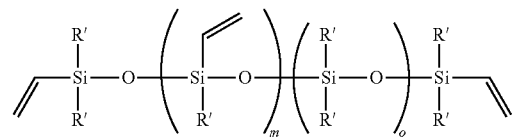

wherein each R' is independently selected from C1 to C6 alkyl; m is 1 or more; and o is 0 or more; and (m+o) is an integer such that the weight average molecular weight of the polyalkylsiloxane is from 35,000 g/mol to 55,000 g/mol. In some examples, each R, each R', n, m, o and (m+o) may be as defined above.

In some examples, the polyalkylsiloxane containing at least two vinyl groups having a weight average molecular weight of 60,000 g/mol or less comprises a vinyl-terminated polyalkylsiloxane (for example, having a weight average molecular weight of 30,000 g/mol or less) and a pendent vinyl polyalkylsiloxane (for example, having a weight average molecular weight of 35,000 g/mol to 55,000 g/mol). In some examples, the polyalkylsiloxane containing at least two vinyl groups having a weight average molecular weight of 60,000 g/mol or less comprises a mixture comprising vinyl-terminated polyalkylsiloxane (for example, having a weight average molecular weight of 30,000 g/mol or less) and pendent vinyl polyalkylsiloxane (for example, having a weight average molecular weight of 35,000 g/mol to 55,000 g/mol) in a weight ratio of from 1:10 to 10:1. In some examples, the polyalkylsiloxane containing at least two vinyl groups having a weight average molecular weight of 60,000 g/mol or less comprises a mixture comprising vinyl-terminated polyalkylsiloxane (for example, having a weight average molecular weight of 30,000 g/mol or less) and pendent vinyl polyalkylsiloxane (for example, having a weight average molecular weight of 35,000 g/mol to 55,000 g/mol) in a weight ratio of from 1:9 to 9:1 mixture, in some examples, from 1:8 to 8:1, in some examples, from 1:7 to 7:1, in some examples, from 1:6 to 6:1, in some examples, from 1:5 to 5:1, in some examples, from 1:4 to 4:1, in some examples, from 1:3 to 3:1, in some examples, from 1:2 to 2:1, in some examples, from 1:1 to 4:1, in some examples, from 1:1 to 2:1.

In some examples, the polyalkylsiloxane containing at least two vinyl groups having a weight average molecular weight of 60,000 g/mol may be present in the curable silicone release formulation in an amount of at least about 50 wt. % based on the total weight of vinyl-containing polyalkylsiloxane compounds. In some examples, the polyalkylsiloxane containing at least two vinyl groups having a weight average molecular weight of 60,000 g/mol may be present in the curable silicone release formulation in an amount of at least about at least about 55 wt. %, at least about 60 wt. %, at least about 65 wt. %, at least about 70 wt. %, at least about 75 wt. %, at least about 80 wt. %, at least about 85 wt. %, at least about 90 wt. %, or at least about 95 wt. % based on the total weight of vinyl-containing polyalkylsiloxane compounds. In some examples, the polyalkylsiloxane containing at least two vinyl groups having a weight average molecular weight of 60,000 g/mol may be present in the curable silicone release formulation in an amount of up to 95 wt. %, for example, up to about 95 wt. %, up to about 90 wt. %, up to about 85 wt. %, up to about 80 wt. %, up to about 75 wt. %, up to about 70 wt. %, up to about 65 wt. %, up to about 60 wt. %, or up to about 55 wt. % based on the total weight of vinyl-containing polyalkylsiloxane compounds. In some examples, the polyalkylsiloxane containing at least two vinyl groups having a weight average molecular weight of 60,000 g/mol may be present in the curable silicone release formulation in an amount of from about 55 wt. % to about 95 wt. %, for example, about 60 wt. % to about 90 wt. %, about 65 wt. % to about 85 wt. %, about 70 wt. % to about 80 wt. %, or about 75 wt. % to about 80 wt. % based on the total weight of vinyl-containing polyalkylsiloxane compounds. In some examples, the polyalkylsiloxane containing at least two vinyl groups having a weight average molecular weight of 60,000 g/mol may be as described above, for example, a mixture comprising a polyalkylsiloxane containing two vinyl groups (for example, terminal vinyl groups) having a weight average molecular weight of 30,000 g/mol or less; and a polyalkylsiloxane containing at least three vinyl groups (for example, two terminal vinyl groups and at least one pendent vinyl group) having a weight average molecular weight of 35,000 g/mol to 55,000 g/mol, which may be present in any ratio described above (for example, a 4:1 weight ratio).

In some examples, the polyalkylsiloxane containing at least two vinyl groups having a weight average molecular weight of 60,000 g/mol may be present in the curable silicone release formulation in an amount of at least about 90 mol % based on the total number of moles of vinyl-containing polyalkylsiloxane compounds. In some examples, the polyalkylsiloxane containing at least two vinyl groups having a weight average molecular weight of 60,000 g/mol may be present in the curable silicone release formulation in an amount of at least about 90.5 mol %, for example, at least about 91 mol %, at least about 91.5 mol %, at least about 92 mol %, at least about 92.5 mol %, at least about 93 mol %, at least about 93.5 mol %, at least about 94 mol %, at least about 94.5 mol %, at least about 95 mol %, at least about 95.5 mol %, at least about 96 mol %, at least about 96.5 mol %, at least about 97 mol %, at least about 97.5 mol %, at least about 98 mol %, at least about 98.5 mol %, at least about 99 mol %, or at least about 99.5 mol % based on the total number of moles of vinyl-containing polyalkylsiloxane compounds. In some examples, the polyalkylsiloxane containing at least two vinyl groups having a weight average molecular weight of 60,000 g/mol may be present in the curable silicone release formulation in an amount of up to 99.5 mol %, for example, up to about 99 mol %, up to about 98.5 mol %, up to about 98 mol %, up to about 97.5 mol %, up to about 97 mol %, up to about 96.5 mol %, up to about 96 mol %, up to about 95.5 mol %, up to about 95 mol %, up to about 94.5 mol %, up to about 94 mol %, up to about 93.5 mol %, up to about 93 mol %, up to about 92.5 mol %, up to about 92 mol %, up to about 91.5 mol %, up to about 91 mol %, up to about 90.5 mol %, or up to about 90 mol % based on the total number of moles of vinyl-containing polyalkylsiloxane compounds. In some examples, the polyalkylsiloxane containing at least two vinyl groups having a weight average molecular weight of 60,000 g/mol may be present in the curable silicone release formulation in an amount of from about 90 mol % to about 99.5 mol %, for example, about 90.5 mol % to about 99 mol %, about 91 mol % to about 98.5 mol %, about 91.5 mol % to about 98 mol %, about 92 mol % to about 97.5 mol %, about 92.5 mol % to about 97 mol %, about 93 mol % to about 96.5 mol %, about 93.5 mol % to about 96 mol %, about 94 mol % to about 95.5 mol %, about 94.5 mol % to about 95 mol % based on the total number of moles of vinyl-containing polyalkylsiloxane compounds. In some examples, the polyalkylsiloxane containing at least two vinyl groups having a weight average molecular weight of 60,000 g/mol may be as described above, for example, a mixture comprising a polyalkylsiloxane containing two vinyl groups (for example, terminal vinyl groups) having a weight average molecular weight of 30,000 g/mol or less and a polyalkylsiloxane containing at least three vinyl groups (for example, two terminal vinyl groups and at least one pendent vinyl group) having a weight average molecular weight of 35,000 g/mol to 55,000 g/mol, which may be present in any ratio described above (for example, a 4:1 weight ratio).

Suitable examples of the polyalkylsiloxane containing at least two vinyl groups having a weight average molecular weight of 60,000 g/mol or less include Polymer VS 50, Polymer VS 100, Polymer VS 200, Polymer VS 500, Polymer VS 1000, Polymer VS 200, Polymer RV 100, Polymer RV 200, Polymer RV 500, available from Evonik Industries. Other suitable examples include DMS-V00 (186 g/mol), DMS-V03 (500 g/mol), DMS-V05 (800 g/mol), DMS-V21 (6000 g/mol), DMS-V22 (9400 g/mol), DMS-V25 (17,200 g/mol), DMS-V31 (28,000 g/mol), DMS-V33 (43,000 g/mol), DMS-V34 (45,000 g/mol), DMS-V35 (49,500 g/mol) from Gelest Inc., Stroofstrasse 27, Geb.2901, 65933 Frankfurt am Main, Germany.

Polyalkylsiloxane Cross-Linker

In some examples, the curable silicone release formulation comprises a polyalkylsiloxane cross-linker containing at least two Si—H bonds. In some examples, the polyalkylsiloxane cross-linker is selected from a linear polyalkylsiloxane cross-linker, a branched polyalkylsiloxane cross-linker and a cyclic polyalkylsiloxane cross-linker. In some examples, the polyalkylsiloxane cross-linker containing at least two Si—H bonds is a linear polyalkylsiloxane cross-linker.

In some examples, the polyalkylsiloxane cross-linker containing at least two Si—H bonds comprises a polyalkylsiloxane cross-linker having the following formula:

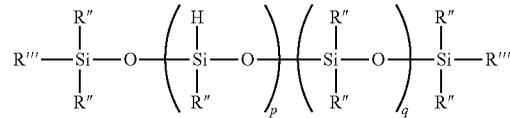

wherein each R" is independently selected from C1 to C6 alkyl; each R'" is independently selected from H and C1 to C6 alkyl; p is 2 or more; and q is 0 or more.

In some examples, each R" is independently selected from C1, C2, C3, C4, C5 and C6 alkyl. In some examples, each R" is independently selected from methyl, ethyl, n-propyl, isopropyl, n-butyl, sec-butyl, isobutyl, tert-butyl, pentyl, 2-methylbutan-2-yl, 2,2-dimethylpropyl, 3-methylbutyl, pentan-2-yl, and pentan-3-yl. In some examples, each R" is independently selected from methyl, ethyl, n-propyl, isopropyl, n-butyl, sec-butyl, isobutyl, and tert-butyl. In some examples, each R" is independently selected from methyl, ethyl, n-propyl, and isopropyl. In some examples, each R" is the same. In some examples, each R" is methyl.

In some examples, each R'" is independently selected from H, C1, C2, C3, C4, C5 and C6 alkyl. In some examples, each R'" is independently selected from H, methyl, ethyl, n-propyl, isopropyl, n-butyl, sec-butyl, isobutyl, tert-butyl, pentyl, 2-methylbutan-2-yl, 2,2-dimethylpropyl, 3-methylbutyl, pentan-2-yl, and pentan-3-yl. In some examples, each R'" is independently selected from H, methyl, ethyl, n-propyl, isopropyl, n-butyl, sec-butyl, isobutyl, and tert-butyl. In some examples, each R'" is independently selected from H, methyl, ethyl, n-propyl, and isopropyl. In some examples, each R''' is the same. In some examples, each R''' is H or methyl. In some examples, each R''' is H. In some examples, each R''' is methyl. In some examples, one R''' is H and the second R''' is methyl.

In some examples, R'' is methyl and R''' is selected from H and methyl.

In some examples, p is 2 or more, in some examples, 3 or more, in some examples, 4 or more, in some examples, 5 or more, in some examples, 6 or more, in some examples, 7 or more, in some examples, 8 or more, in some examples, 9 or more, in some examples, in some examples, 10 or more, in some examples, 20 or more, in some examples, 50 or more. In some examples, p is 50 or less, in some examples, 20 or less, in some examples, 10 or less, in some examples, 9 or less, in some examples, 8 or less, in some examples, 7 or less, in some examples 6 or less, in some examples, 5 or less, in some examples, 4 or less, in some examples, 3 or less, in some examples, 2 or less. In some examples, p is 2 to 50, in some examples, 3 to 10, in some examples, 4 to 9, in some examples, 5 to 8, in some examples, 6 to 7.

In some examples, q is 0 or more, in some examples, 1 or more, in some examples, 2 or more, in some examples, 3 or more, in some examples, 4 or more, in some examples, 5 or more, in some examples, 6 or more, in some examples, 7 or more, in some examples, 8 or more, in some examples, 9 or more, in some examples, in some examples, 10 or more, in some examples, 20 or more, in some examples, 50 or more. In some examples, q is 50 or less, in some examples, 20 or less, in some examples, 10 or less, in some examples, 9 or less, in some examples, 8 or less, in some examples, 7 or less, in some examples 6 or less, in some examples, 5 or less, in some examples, 4 or less, in some examples, 3 or less, in some examples, 2 or less, in some examples, 1 or less. In some examples, q is 0 to 50, in some examples, 1 to 10, in some examples, 2 to 9, in some examples, 3 to 8, in some examples, 4 to 7, in some examples, 5 to 6.

In some examples, the polyalkylsiloxane cross-linker may be a random copolymer, a block copolymer, an alternating copolymer or a periodic copolymer. In some examples, the polyalkylsiloxane cross-linker may be a random copolymer.

In some examples, the polyalkylsiloxane cross-linker has a dynamic viscosity at 25° C. of 5 mPa·s or more, in some examples, 10 mPa·s or more, in some examples, 15 mPa·s or more, in some examples, 20 mPa·s or more, in some examples, 25 mPa·s or more, in some examples, 30 mPa·s or more, in some examples, 35 mPa·s or more, in some examples 40 mPa·s or more, in some examples, 45 mPa·s or more, in some examples, 50 mPa·s or more, in some examples, 55 mPa·s or more, in some examples, 60 mPa·s or more, in some examples, 65 mPa·s or more, in some examples, 70 mPa·s or more, in some examples, 75 or more, in some examples, about 80 mPa·s. In some examples, the polyalkylsiloxane cross-linker has a dynamic viscosity at 25° C. or 80 mPa·s or less, in some examples, 75 mPa·s or less, in some examples, 70 mPa·s or less, in some examples, 65 mPa·s or less, in some examples, 60 mPa·s or less, in some examples, 55 mPa·s or less, in some examples, 50 mPa·s or less, in some examples, 45 mPa·s or less, in some examples, 40 mPa·s or less, in some examples, 35 mPa·s or less, in some examples, 30 mPa·s or less, in some examples, 25 mPa·s or less, in some examples, 20 mPa·s or less, in some examples, 15 mPa·s or less, in some examples, about 10 mPa·s. In some examples, the polyalkylsiloxane cross-linker has a dynamic viscosity at 25° C. of 10 mPa·s to 80 mPa·s, in some examples, 15 mPa·s to 75 mPa·s, in some examples, 20 mPa·s to 70 mPa·s, in some examples, 25 mPa·s to 65 mPa·s, in some examples, 30 mPa·s to 60 mPa·s, in some examples, 35 mPa·s to 55 mPa·s, in some examples, 40 mPa·s to 50 mPa·s, in some examples, 40 mPa·s to 45 mPa·s.

In some examples, the polyalkylsiloxane cross-linker may have an Si—H content of 1 mmol/g or more, in some examples, 2 mmol/g or more, in some examples, 3 mmol/g or more, in some examples, 3.5 mmol/g or more, in some examples, 4 mmol/g or more, in some examples, 4.1 mmol/g or more, in some examples, 4.2 mmol/g or more, in some examples, 4.3 mmol/g or more, in some examples, 4.5 mmol/g or more, in some examples, 5 mmol/g or more, in some examples, 6 mmol/g or more, in some examples, 7 mmol/g or more, in some examples, about 8 mmol/g. In some examples, the polyalkylsiloxane cross-linker may have an Si—H content of 8 mmol/g or less, in some examples, 7 mmol/g or less, in some examples, 6 mmol/g or less, in some examples, 5 mmol/g or less, in some examples, 4.5 mmol/g or less, in some examples, 4.4 mmol/g or less, in some examples, 4.3 mmol/g or less, in some examples, 4.2 mmol/g or less, in some examples, 4.1 mmol/g or less, in some examples, 4 mmol/g or less, in some examples, 3.5 mmol/g or less, in some examples, 3 mmol/g or less, in some examples, 2 mmol/g or less, in some examples, about 1 mmol/g. In some examples, the polyalkylsiloxane cross-linker may have an Si—H content of 1 mmol/g to 8 mmol/g, in some examples, 2 mmol/g to 7 mmol/g, in some examples, 3 mmol/g to 6 mmol/g, in some examples, 3.5 mmol/g mmol/g to 5 mmol/g, in some examples, 4 mmol/g to 4.5 mmol/g, in some examples, 4.1 mmol/g to 4.4 mmol/g, in some examples, 4.2 mmol/g to 4.3 mmol/g.

Suitable examples of the polyalkylsiloxane cross-linker include Cross-linker 200, Cross-linker 210, Cross-linker 100, Cross-linker 101, Cross-linker 120, Cross-linker 125 or Cross-linker 190, available from Evonik Industries. Other suitable crosslinkers include HMS-031, HMS-071, HMS-082, HMS-013, and HMS-064 from Gelest Inc., Stroofstrasse 27, Geb.2901, 65933 Frankfurt am Main, Germany).

In some examples, the curable silicone release formulation comprises a ratio of polyalkylsiloxane containing cross-linker to the mixture of the polyalkylsiloxanes containing vinyl groups such that the mole ratio of hydride to vinyl is from 7 to 1.5. In some examples, the curable silicone release formulation comprises a ratio of polyalkylsiloxane containing cross-linker to the mixture of the polyalkylsiloxanes containing vinyl groups such that the mole ratio of hydride to vinyl is from 6.5 to 1.6, in some examples, 6 to 1.7, in some examples, 5.5 to 1.8, in some examples, 5 to 1.9, in some examples, 4.5 to 2, in some examples, 4 to 2.1, in some examples, 3.5 to 2.2, in some examples, 3.4 to 2.3, in some examples, 3.3 to 2.4, in some examples, 3.2 to 2.5, in some examples, 3.1 to 2.6, in some examples, 3 to 2.7, in some examples, 2.9 to 2.8 In some examples, the curable silicone release formulation comprises a ratio of polyalkylsiloxane containing cross-linker to the mixture of the polyalkylsiloxanes containing vinyl groups such that the mole ratio of hydride to vinyl is about 2.2, about 1.3, about 2.4, about 2.5, about 2.6, about 2.7, about 2.8, about 2.9, about 3, about 3.1, about 3.2, about 3.3, about 3.4.

Catalyst or Photoinitiator

In some examples, the catalyst or photoinitiator may initiate and/or catalyse the curing of the curable silicone release layer. In some examples, the catalyst or photoinitiator may be a thermally activatable catalyst, a UV activatable catalyst, an IR activatable catalyst or a photoinitiator, for example, a photoinitiator or photo-catalyst activatable on exposure to UV-A radiation. In some examples, catalyst or photoinitiator may be a thermally activatable catalyst, a photo-catalyst, or a photoinitiator. In some examples, the catalyst or photoinitiator may be selected from divinyl-tetramethyl-disiloxane—platinum(0), [Pt(acac)$_2$], UV-A photoinitiators, Darocur® 1173™ (available from BASF), which comprises 2-hydroxy 2-methyl 1-phenyl 1-propanone, and Karstedt's catalyst solution (9 wt. % Pt, available from Johnson Matthey).

In some examples, the curable silicone release formulation may comprise, by total weight of the formulation, at least 5 wt. % of a catalyst or photoinitiator, for example, at least 6 wt. %, at least 7 wt. %, at least 8 wt. %, at least 9 wt. %, at least 10 wt. %, at least 11 wt. %, at least 12 wt. %, at least 13 wt. %, at least 14 wt. %, or at least 15 wt. % of a catalyst or photoinitiator. In some examples, the curable silicone release formulation may comprise, by total weight of the formulation, up to 15 wt. % of a catalyst or photoinitiator, for example, up to 14 wt. %, up to 13 wt. %, up to 12 wt. %, up to 11 wt. %, up to 10 wt. %, up to 9 wt. %, up to 8 wt. %, up to 7 wt. %, up to 6 wt. %, or up to 5 wt. % of a catalyst or photoinitiator. In some examples, the curable silicone release formulation may comprise, by total weight of the formulation, from 5 wt. % to 15 wt. % of a catalyst or photoinitiator, for example, from 6 wt. % to 14 wt. %, 7 wt. % to 13 wt. %, 8 wt. % to 12 wt. %, 9 wt. % to 11 wt. %, 10 wt. % to 15 wt. % of a catalyst or photoinitiator.

In some examples, the curable silicone release formulation may comprise a catalyst and a photoinitiator. In some examples, the curable silicone release formulation may comprise a catalyst and a photoinitiator in a 2:1 weight ratio. In some examples, the curable silicone release formulation may comprise 5 wt. % photoinitiator and 10 wt. % catalyst.

Thermal Inhibitor

In some examples, the curable silicone release formulation comprises a thermal inhibitor. In some examples, the thermal inhibitor comprises an acetylenic alcohol or an alkanol. In some examples, the thermal inhibitor inhibits thermal curing of the polyalkylsiloxane containing two vinyl groups having a weight average molecular weight of at least 65,000 g/mol, the polyalkylsiloxane containing at least two vinyl groups having a weight average molecular weight of 60,000 g/mol or less, and the polyalkylsiloxane cross-linker.

In some examples, the curable silicone release formulation comprises 0.001 wt. % to 10 wt. % thermal inhibitor, in some examples, 0.001 wt. % to 5 wt. %, in some examples, 0.01 wt. % to 2.5 wt. %, in some examples, 0.01 wt. % to 2 wt. %, in some examples, 0.1 wt. % to 1 wt. % thermal inhibitor. In some examples, no thermal inhibitor is used.

Suitable examples of the thermal inhibitor include Inhibitor 600, Inhibitor 500 and Inhibitor 400 from Evonik. Other suitable thermal inhibitors include 1,3-divinyltetra-methyl-disiloxane($C_8H_{18}OSi_2$) and 1,3,5,7-tetravinyl-1,3,5,7-tetramethylcyclotetra-siloxane ($C_{12}H_{24}O_4Si_4$), both from Gelest Inc.

Conductive Particles

The curable silicone release formulation may comprise conductive particles. In some examples, the conductive particles may be electrically conductive particles. In some examples, the conductive particles may be carbon black particles.

In some examples, the curable silicone release formulation may comprise 0.01 wt. % to 10 wt. % conductive particles, in some examples, 0.05 wt. % to 9 wt. %, in some examples, 0.1 wt. % to 8 wt. %, in some examples, 0.25 wt. % to 7 wt. %, in some examples, 0.3 wt. % to 6 wt. %, in some examples, 0.4 wt. % to 5 wt. %, in some examples, 0.5 wt. % to 4 wt. %, in some examples, 0.6 wt. % to 3 wt. %, in some examples, 0.7 wt. % to 2.5 wt. %, in some examples, 0.75 wt. % to 2 wt. %, in some examples, 0.8 wt. % to 1.5 wt. %, in some examples 1 wt. % to 2 wt. %, and in some examples 1 wt. % to 1.5 wt. % conductive particles by total weight of the formulation.

In some examples, the curable silicone release formulation comprises greater than 0.8 wt. % conductive particles, for example, carbon black, greater than 1 wt. % conductive particles. In some examples, the curable silicone release formulation comprises at least 1.1 wt. % conductive particles by total weight of the formulation, for example at least 1.2 wt. %, at least 1.3 wt. %, at least 1.4 wt %, or at least 1.5 wt. %.

Suitable examples of the conductive particles include carbon black particles from AkzoNobel under the name Ketjenblack® EC600JD.

Primer

In some examples, the ITM may comprise a primer. In some examples, the primer is applied to the compliant substrate layer of the supportive portion of the ITM before the curable silicone release formulation is applied to the supportive portion. In some examples, the primer forms a primer layer on the ITM. In some examples, the primer may be applied to an uncured compliant soft layer. In some examples, the primer may be applied to a cured compliant soft layer.

In some examples, the primer layer may comprise an organosilane, for example, an organosilane derived from an epoxysilane such as 3-glycidoxypropyltrimethoxysilane, a vinyl silane such as vinyltriethoxysilane or vinyltrimethoxysilane, an allyl silane, an acryloxysilane such as 3-methacryloxypropyltrimethoxysilane, or an unsaturated silane, and a catalyst such as a catalyst comprising titanium or platinum.

The primer layer may be formed from a curable primer. The curable primer may be applied to the compliant substrate layer of the supportive portion of the ITM before a curable silicone release formulation is applied to the supportive portion. The curable primer may comprise an organosilane and a catalyst, for example, a catalyst comprising titanium and/or a catalyst comprising platinum.

In some examples, the organosilane contained in the curable primer is selected from an epoxysilane, a vinyl silane, an allyl silane and an unsaturated silane.

The curable primer may comprise a first primer and a first catalyst, and a second primer and, in some examples, a second catalyst. The first primer and/or the second primer may comprise an organosilane. The organosilane may be selected from an epoxysilane, a vinyl silane, an allyl silane and an unsaturated silane.

In some examples, the first catalyst is a catalyst for catalysing a condensation cure reaction, for example, a catalyst comprising titanium. The first primer may be cured by a condensation reaction by the first catalyst. The second primer may be cured by a condensation reaction by the first catalyst.

In some examples, the second catalyst is a catalyst for catalysing an addition cure reaction.

The curable primer layer may be applied to the compliant layer as a composition containing the first and second primer and first and second catalyst.

In some examples, only one primer is used. If only one primer is used, the primer may be the first primer formulation or the second primer formulation described herein. In some examples, only one primer is used, which comprises the second primer formulation described herein.

First Primer Formulation

A first primer layer, which may also be referred to as a radiation curable or radiation cured primer layer, may be provided on the outer surface of the ITM body. The first primer layer may facilitate bonding or joining of the curable silicone release layer to the ITM body. The first primer layer may be formed from a radiation curable primer. The radiation curable primer may be applied by using a rod coating process or gravure coating process.

In some examples, the radiation curable primer is cured by UV light. The radiation curable primer may comprise a cross-linking compound capable of cross-linking to the outer surface of the layer of the ITM body on which it is disposed when irradiated with UV light. In some examples, the curable primer may comprise a functional organosilane. In some examples, the organosilane contained in the curable primer layer is selected from an epoxysilane, a vinyl silane, an allyl silane and an unsaturated silane, for example an acrylate functional silane, a methacrylate functional silane, an epoxysilane and mixtures thereof.

In some examples, the functional organosilane compound comprises, for example, a methacryloxypropyl trimethoxysilane, such as Dynasylan® MEMO™ (3-methacryloxypropyltrimethoxysilane) available from Degussa, AG of Piscataway, N.J.

In some examples, an epoxysilane is used in the first primer. In some examples, an epoxysilane, such as 3-glycidoxypropyl trimethoxysilane (available from ABCR GmbH & Co. KG) is used.

In some examples, the radiation curable primer comprises a photoinitiator to facilitate cross-linking of the functional organosilane to itself and with the surface of the layer of the ITM body on which it is disposed. In some examples, the photoinitiator includes, but is not limited to, α-hydroxyketones, α-aminoketones, benzaldimethyl-ketal, and mixtures thereof. In one example, the photoinitiator can comprise Darocur® 1173™ available from BASF, which comprises 2-hydroxy 2-methyl 1-phenyl 1-propanone, CAS number 7473-98-5. Other suitable photoinitiators include, but are not limited to, Irgacure® 500™ (a 50/50 blend of 1-hydroxycyclohexyl phenyl ketone and benzophenone), Irgacure® 651™ (an α,α-dimethoxy α-phenyl acetophenone), Irgacure® 907™ (2-methyl-1-[4-(methylthio)phenyl]-2-(4-morpholinyl)-1-propanone) from BASF. Additionally, any other suitable photoinitiators may be used. Generally, the photoinitiator can comprise about 1 wt. % to about 20 wt. % of the total first primer composition. In one example, the photoinitiator can comprise about 1 wt. % to about 5 wt. % of the total first primer composition.

In some examples, the coating of the curable primer is applied onto the layer of the ITM body on which it is disposed at a layer thickness of 10 µm or less, for example, 5 µm or less, for example, 4 µm or less, for example, 3 µm or less, for example, 2 µm or less, for example, 1 µm or less, for example, 0.5 µm or less, for example, about 250 nm. In some examples, the coating of the curable primer is applied onto the layer of the ITM body on which it is disposed at a layer thickness of 250 nm or more, for example, 0.5 µm or more, for example, 1 µm or more, for example, 2 µm or more, for example, 4 µm or more, for example, 5 µm or more, for example, about 10 µm. In some examples, the coating of the curable primer is applied onto the layer of the ITM body on which it is disposed at a layer thickness of from 250 nm to 10 µm, for example, from 0.5 µm to 5 µm, for example, about 1 µm.

Second Primer Formulation

In some examples, a second primer composition, which may also be referred to as a curable composition, is provided on the outer surface of the first primer already applied to the ITM body. In some examples, the curable composition is applied to the outer surface of the first primer after curing of the first primer by irradiation. The curable composition may be applied using a rod coating process or gravure coating. The second primer composition facilitates bonding of the curable silicone release layer to the ITM body layer via the first primer.

In some examples, the curable composition is thermally curable. In some examples, the curable composition comprises a reactive monomer with addition polymerisable groups and condensation polymerisable groups. In some examples, the curable composition comprises a functional silane. Examples of functional silanes that can be used in the curable composition include but are not limited to an epoxysilane, an amino functional silane, an alkylsilane, a vinyl silane, an allyl silane, an unsaturated silane, a non-functional dipodal silane (e.g., bis triethoxysilyl octane), and their condensed forms constituted by oligomers of the monomeric form of the silane.

In some examples, the functional silane comprises a hydrolysable portion. In some examples, the hydrolysable portion of the silane comprises an alkoxy group (e.g., alkoxysilane with an alkoxy group selected from the group consisting of methoxy, ethoxy, propoxy, isopropoxy, methoxyethoxy, and the like). In some examples, the functional silane comprises an epoxyalkyl alkoxysilane (e.g., glycidoxypropyl trimethoxysilane-silane Dynasilan GLYMO (Degussa). In some examples, the hydrolysable group may also be an oxime group (e.g., methylethylketoxime group) or an acetoxy group. Another illustrative example of an organosilane useful in the second primer is a hydrolysable vinyl silane, for example vinyltriethoxysilane (VTEO, available from Evonik, Kirschenallee, Darmstadt, 64293, Germany), a hydrolysable allyl silane or a hydrolysable unsaturated silane. In some examples, the second primer may comprise (3-glycidoxypropyl)trimethoxysilane and/or vinyltrimethoxysilane. In some examples, the second primer may comprise (3-glycidoxypropyl)trimethoxysilane and/or vinyl-triethoxysilane.

The curable composition may comprise first and second catalysts, which are different to each other. In some examples, the first and second catalysts catalyse different types of polymerisation reaction. In some examples, the first catalyst catalyses a condensation polymerisation reaction. In some examples, the second catalyst catalyses an addition polymerisation reaction. In some examples, the curable composition comprises first and second catalysts, with the first catalyst catalysing the curing of the curable composition and the second catalyst catalysing the curing of the curable silicone release formulation. In some examples, the first catalyst also catalyses the cross-linking of the curable composition to the radiation-cured first primer. In some examples, the second catalyst also catalyses the cross-linking of the curable composition to the curable silicone release formulation.

In some examples, the first catalyst component of the curable composition comprises a titanate or a tin catalyst, or, alternatively, comprises any suitable compound that is capable of catalysing a condensation curing reaction of the organosilane of the curable composition. In certain embodiments, the first catalyst comprises an organic titanate catalyst such as acetylacetonate titanate chelate, available as, for example, Tyzor® AA-75 from E.I. du Pont de Nemours and Company of Wilmington, Del.) In some examples, the first catalyst comprises about 1 wt. % to 20 wt. % of the total primer layer. In some examples, the first catalyst comprises about 1 wt. % to 5 wt. % of the total primer layer. Without being bound by theory, it is believed that acetylacetonate titanate chelate (Tyzor® AA-75) initiates a condensation reaction between the first and second primer components, inducing adhesion between the first and second primers.

In some examples, the second catalyst comprises platinum, or any other catalyst capable of catalysing an addition cure curing reaction of the second primer or curable composition. In some examples, the second catalyst comprises platinum or rhodium. In some examples, the second catalyst comprises a Karstedt catalyst with for example 9 wt. % or 10 wt. % platinum in solution (available from Johnson Matthey, 5th Floor, 25 Farringdon Street, London EC4A 4AB, United Kingdom) or SIP6831.2 catalyst (available from Gelest, 11 East Steel Road, Morrisville, Pa. 19067, USA).

In some examples, the coating of the curable composition (second primer) is applied onto the cured primer layer (cured first primer layer) at a layer thickness of 10 µm or less, for example, 5 µm or less, for example, 4 µm or less, for example, 3 µm or less, for example, 2 µm or less, for example, 1 µm or less, for example, 0.5 µm or less, for example, about 250 nm. In some examples, the coating of the curable composition (second primer) is applied onto the cured primer layer (cured first primer layer) at a layer thickness of 250 nm or more, for example, 0.5 µm or more, for example, 1 µm or more, for example, 2 µm or more, for example, 4 µm or more, for example, 5 µm or more, for example, about 10 µm. In some examples, the coating of the curable composition (second primer) is applied onto the cured primer layer (cured first primer layer) at a layer thickness of from 250 nm to 10 µm, for example, from 0.5 µm to 5 µm, for example, about 1 µm.

Method of Making the Curable Silicone Release Formulation

In some examples, a polyalkylsiloxane containing two vinyl groups having a weight average molecular weight of at least 65,000 g/mol may be combined with a polyalkylsiloxane containing at least two vinyl groups having a weight average molecular weight of 60,000 g/mol or less, a polyalkylsiloxane cross-linker containing at least two Si—H bonds and a catalyst or photoinitiator. In some examples, a polyalkylsiloxane containing two vinyl groups having a weight average molecular weight of at least 65,000 g/mol may be combined with a polyalkylsiloxane containing two vinyl groups having a weight average molecular weight of 30,000 g/mol or less, a polyalkylsiloxane containing at least three vinyl groups having a weight average molecular weight of 35,000 g/mol to 55,000 g/mol, a polyalkylsiloxane cross-linker containing at least two Si—H bonds and a catalyst or photoinitiator.

In some examples, a polyalkylsiloxane containing two vinyl groups having a weight average molecular weight of at least 65,000 g/mol may be combined with a a polyalkylsiloxane containing at least two vinyl groups having a weight average molecular weight of 60,000 g/mol or less, a polyalkylsiloxane cross-linker containing at least two Si—H bonds, a catalyst or photoinitiator, and conductive particles. In some examples, a polyalkylsiloxane containing two vinyl groups having a weight average molecular weight of at least 65,000 g/mol may be combined with a polyalkylsiloxane containing two vinyl groups having a weight average molecular weight of 30,000 g/mol or less, a polyalkylsiloxane containing at least three vinyl groups having a weight average molecular weight of 35,000 g/mol to 55,000 g/mol, a polyalkylsiloxane cross-linker containing at least two Si—H bonds, a catalyst or photoinitiator, and conductive particles.

In some examples, a polyalkylsiloxane containing two vinyl groups having a weight average molecular weight of at least 65,000 g/mol may be combined with a a polyalkylsiloxane containing at least two vinyl groups having a weight average molecular weight of 60,000 g/mol or less, a polyalkylsiloxane cross-linker containing at least two Si—H bonds, a catalyst or photoinitiator, and a thermal inhibitor. In some examples, a polyalkylsiloxane containing two vinyl groups having a weight average molecular weight of at least 65,000 g/mol may be combined with a polyalkylsiloxane containing two vinyl groups having a weight average molecular weight of 30,000 g/mol or less, a polyalkylsiloxane containing at least three vinyl groups having a weight average molecular weight of 35,000 g/mol to 55,000 g/mol, a polyalkylsiloxane cross-linker containing at least two Si—H bonds, a catalyst or photoinitiator, and a thermal inhibitor.

In some examples, a polyalkylsiloxane containing two vinyl groups having a weight average molecular weight of at least 65,000 g/mol may be combined with a a polyalkylsiloxane containing at least two vinyl groups having a weight average molecular weight of 60,000 g/mol or less, a polyalkylsiloxane cross-linker containing at least two Si—H bonds, a catalyst or photoinitiator, conductive particles and a thermal inhibitor. In some examples, a polyalkylsiloxane containing two vinyl groups having a weight average molecular weight of at least 65,000 g/mol may be combined with a polyalkylsiloxane containing two vinyl groups having a weight average molecular weight of 30,000 g/mol or less, a polyalkylsiloxane containing at least three vinyl groups having a weight average molecular weight of 35,000 g/mol to 55,000 g/mol, a polyalkylsiloxane cross-linker containing at least two Si—H bonds, a catalyst or photoinitiator, conductive particles and a thermal inhibitor.

In some examples, the polyalkylsiloxane containing two vinyl groups having a weight average molecular weight of at least 65,000 g/mol, the polyalkylsiloxane containing at least two vinyl groups having a weight average molecular weight of 60,000 g/mol or less, the a polyalkylsiloxane cross-linker containing at least two Si—H bonds, and the catalyst or photoinitiator may be combined in any order. In some examples, the polyalkylsiloxane containing two vinyl groups having a weight average molecular weight of at least 65,000 g/mol, the polyalkylsiloxane containing two vinyl groups having a weight average molecular weight of 30,000 g/mol or less, the polyalkylsiloxane containing at least three vinyl groups having a weight average molecular weight of 35,000 g/mol to 55,000 g/mol, the polyalkylsiloxane cross-linker containing at least two Si—H bonds, and the catalyst or photoinitiator may be combined in any order.

In some examples, the conductive particles may be added before, during or after the polyalkylsiloxane compounds containing vinyl groups are combined. In some example, the conductive particles may be added before, during or after the polyalkylsiloxane compounds containing vinyl groups and the polyalkylsiloxane cross-linker have been combined.

In some examples, the thermal inhibitor may be added before, during, or after the polyalkylsiloxane compounds containing vinyl groups are combined. In some examples, the thermal inhibitor may be added before, during, or after the polyalkylsiloxane compounds containing the vinyl groups and the polyalkylsiloxane cross-linker have been combined. In some examples, the thermal inhibitor may be added before, during or after the conductive particles.

In some examples, the catalyst or photoinitiator is the final component added to form the curable silicone release formulation. In some examples, the catalyst or photoinitiator is added just before application of the curable silicone release formulation to the intermediate transfer member body.

In some examples, the polyalkylsiloxane compounds containing vinyl groups are combined with conductive particles before addition of the polyalkylsiloxane cross-linker and, optionally, the thermal inhibitor.

In some examples, the polyalkylsiloxane containing vinyl groups are combined to form a mixture of vinyl group containing polyalkylsiloxanes, to which is then added the conductive particles, and then a polyalkylsiloxane cross-linker is added. In some examples, a thermal inhibitor may then be added before a catalyst of photoinitiator is added.

In some examples, the composition to which a photoinitiator is to be added is protected from light, for example, by wrapping the container in aluminium foil or using a container formed from a light-proof material, before addition of the photoinitititator.

In some examples, the components of the curable silicone release formulation may be combined by high shear mixing. In some examples, a polyalkylsiloxane containing two vinyl groups having a weight average molecular weight of at least 65,000 g/mol is combined with a polyalkylsiloxane containing at least two vinyl groups having a weight average molecular weight of 60,000 g/mol or less (e.g., a mixture comprising a polyalkylsiloxane containing two vinyl groups having a weight average molecular weight of 30,000 g/mol or less and a polyalkylsiloxane containing at least three vinyl groups having a weight average molecular weight of 35,000 g/mol to 55,000 g/mol) and optionally, the conductive particles and/or the catalyst or photoinitiator, under high shear mixing. In some examples, a polyalkylsiloxane cross-linker is added under further high shear mixing. In some examples, a polyalkylsiloxane containing two vinyl groups having a weight average molecular weight of at least 65,000 g/mol is combined with a polyalkylsiloxane containing at least two vinyl groups having a weight average molecular weight of 60,000 g/mol or less (e.g., a mixture comprising a polyalkylsiloxane containing two vinyl groups having a weight average molecular weight of 30,000 g/mol or less and a polyalkylsiloxane containing at least three vinyl groups having a weight average molecular weight of 35,000 g/mol to 55,000 g/mol) and optionally, the conductive particles and/or a polyalkylsiloxane cross-linker, under high shear mixing. In some examples, the catalyst or photoinitiator is added under further high shear mixing.

In some examples, the high shear mixing is at 3,000 rpm or more, in some examples, 3,500 rpm or more, in some examples, 4,000 rpm or more, in some examples, 4,500 rpm or more, in some examples, 5,000 rpm or more, in some examples, 5,500 rpm or more, in some examples, 6,000 rpm or more, in some examples, 6,500 rpm or more, in some examples, 7,000 rpm or more, in some examples 7,500 rpm or more, in some examples, 8,000 rpm or more, in some examples, 8,500 rpm or more, in some examples, about 9,000 rpm. In some examples, the high shear mixing is at 9,000 rpm or less, in some examples, 8,500 rpm or less, in some examples, 8,000 rpm or less, in some examples, 7,500 rpm or less, in some examples, 7,000 rpm or less, in some examples, 6,500 rpm or less, in some examples, 6,000 rpm or less, in some examples, 5,500 rpm or less, in some examples, 5,000 rpm or less, in some examples, 4,500 rpm or less, in some examples, 4,000 rpm or less, in some examples, 3,500 rpm or less, in some examples, about 3,000 rpm. In some examples, the high shear mixing is at 3,000 rpm to 9,000 rpm, in some examples, 3,500 rpm to 8,500 rpm, in some examples, 4,000 rpm to 8,000 rpm, in some examples, 4,500 rpm to 7,500 rpm, in some examples, 5,000 rpm to 7,000 rpm, in some examples, 5,500 rpm to 6,500 rpm, in some examples, 6,000 rpm to 6,500 rpm.

In some examples, the curable silicone release formulation is stored in the dark.

Method of Producing an Intermediate Transfer Member

In an aspect, there is provided a method of producing an intermediate transfer member for digital offset printing comprising applying onto an intermediate transfer member body a curable silicone release formulation; curing the curable silicone release formulation to form a cured silicone release layer; wherein the curable silicone release formulation comprises: a polyalkylsiloxane containing at least two vinyl groups having a weight average molecular weight of 60,000 g/mol or less; a polyalkylsiloxane containing two vinyl groups having a weight average molecular weight of at least 65,000 g/mol; a polyalkylsiloxane cross-linker containing at least two Si—H bonds; and a catalyst or a photoinitiator. In some examples, the method of producing an intermediate transfer member for digital offset printing comprises applying onto an intermediate transfer member body a curable silicone release formulation; curing the curable silicone release formulation to form a cured silicone release layer; wherein the curable silicone release formulation comprises: a polyalkylsiloxane containing at least two vinyl groups having a weight average molecular weight of 60,000 g/mol or less; a polyalkylsiloxane containing two vinyl groups having a weight average molecular weight of 30,000 g/mol or less, a polyalkylsiloxane containing at least three vinyl groups having a weight average molecular weight of 35,000 g/mol to 55,000 g/mol; a polyalkylsiloxane cross-linker containing at least two Si—H bonds; and a catalyst or a photoinitiator.

In some examples, the method comprises applying onto an intermediate transfer member body a curable silicone release formulation. The intermediate transfer member body may comprise one or more of a metal base, a fabric layer, a compressible layer, and a conductive layer as described herein, with the curable silicone release formulation being applied to the conductive layer. In some examples, the layer comprising the curable silicone release formulation is as described herein.

In some examples, the curable silicone release formulation is applied onto the ITM body by extrusion, calendering, lamination, gravure coating, rod coating, flexo coating, screen coating, spray coating, gravure coating, roll coating, reverse roll coating, gap coating, slot die coating, immersion coating, curtain coating, air knife coating, flood coating, lithography, or combinations thereof. Using these methods, the curable silicone release formulation can be processed in a straightforward manner with or without the use of solvents.

In some examples, the curable silicone release formulation is applied onto the ITM body at a gravure volume of 5 $cm^2/m^3$ or more, in some examples, 10 $cm^2/m^3$ or more, in some examples, 11 $cm^2/m^3$ or more, in some examples, 12 $cm^2/m^3$ or more, in some examples, 13 $cm^2/m^3$ or more, in some examples, 14 $cm^2/m^3$ or more, in some examples, 15 $cm^2/m^3$ or more, in some examples, 20 $cm^2/m^3$ or more. In some examples, the curable silicone release formulation is applied onto the ITM body at a gravure volume of 20 $cm^2/m^3$ or less, in some examples, 15 $cm^2/m^3$ or less, in some examples, 14 $cm^2/m^3$ or less, in some examples, 13 $cm^2/m^3$ or less, in some examples, 12 $cm^2/m^3$ or less, in some examples, 11 $cm^2/m^3$ or less, in some examples, 10 $cm^2/m^3$ or less, in some examples, 5 $cm^2/m^3$ or less. In some examples, the curable silicone release formulation is applied onto the ITM body at a gravure volume of 5 cm$^2$/m$^3$ to 20 cm$^2$/m$^3$, in some examples, 10 cm$^2$/m$^3$ to 15 cm$^2$/m$^3$, in some examples, 11 cm$^2$/m$^3$ to 14 cm$^2$/m$^3$, in some examples, 12 cm$^2$/m$^3$ to 14 cm$^2$/m$^3$, in some examples, 13 cm$^2$/m$^3$ to 14 cm$^2$/m$^3$.

The method may comprise applying a coating of a primer, optionally a radiation curable primer, onto the ITM body. In some examples, the coating of a radiation curable primer is applied using gravure coating, calendering, rod coating, flexo coating, screen coating, spray coating, gravure coating, roll coating, reverse roll coating, gap coating, slot die coating, immersion coating, curtain coating, air knife coating, flood coating, lithography or combinations thereof.

In some examples, the coating of the primer, optionally the radiation curable primer is applied onto the ITM at a layer thickness as described above. In some examples, the composition of the radiation curable primer is as described above. The method may comprise irradiating the coating of radiation curable primer (for example, the first primer) to provide a coating of cured primer. In some examples, the coating of radiation curable primer is irradiated with light having a wavelength that corresponds to the optimal wavelength for the photoinitiator. In some examples, the step of irradiating comprises irradiating the coating of radiation curable primer using UV irradiation. The duration of irradiation will depend on the power rating of the radiation source being used and the actual power supplied. In some examples, irradiating the coating of radiation curable primer comprises irradiating in order to fully cure the primer. In some examples, irradiating the coating of radiation curable primer comprises irradiating in order to at least partially cure the primer. In some examples, the radiation cured primer composition comprises a polymerisation product of an epoxysilane, a vinyl silane, an allyl silane, an acrylate functional silane, a methacrylate functional silane and mixtures thereof.

The method may comprise applying onto the coating of cured primer a second primer in the form of a curable composition comprising first and second catalysts. In some examples, the curable composition is applied using gravure coating, calendering, rod coating, flexo coating, screen coating, spray coating, gravure coating, roll coating, reverse roll coating, gap coating, slot die coating, immersion coating, curtain coating, air knife coating, flood coating, lithography, or combinations thereof. In some examples, the composition of the curable composition is as described herein.

In some examples, the coating of the curable composition (second primer) is applied onto the radiation cured primer layer at a layer thickness as described herein.

The method may comprise applying onto the curable composition a curable silicone release formulation. The curable silicone release formulation may be applied onto the curable composition before any substantial curing of the curable composition has taken place. In some examples, the curable silicone release formulation is applied onto the curable composition at a layer thickness as described herein.

The method may comprise simultaneously curing the curable primer composition and the curable silicone release formulation.

In some examples, curing the curable silicone release formulation occurs by exposing the curable silicone release formulation to heat or irradiation, for example, UV-A irradiation.

In some examples, the method comprises curing the curable silicone release formulation by irradiating the curable silicone release formulation for 1 second or more, in some examples, 2 seconds or more, in some examples, 3 seconds or more, in some examples, 4 seconds or more, in some examples, 5 seconds or more, in some examples, 6 seconds or more, in some examples, 7 seconds or more, in some examples, 8 seconds or more, in some examples, 9 seconds or more, in some examples, 10 seconds or more, in some examples, 15 seconds or more, in some examples, 20 seconds or more. In some examples, the method comprises curing the curable silicone release formulation by irradiating the curable silicone release formulation for 20 seconds or less, in some examples, 10 seconds or less, in some examples, 9 seconds or less, in some examples 8 seconds or less, in some examples, 7 seconds or less, in some examples, 6 seconds or less, in some examples, 5 seconds or less, in some examples, 5 seconds or less, in some examples, 4 seconds or less, in some examples, 3 seconds or less, in some examples, 2 seconds or less, in some examples, 1 second or less. In some examples, the method comprises curing the curable silicone release formulation by irradiating the curable silicone release formulation for 1 second to 20 seconds, in some examples, 2 seconds to 10 seconds, in some examples, 3 seconds to 9 seconds, in some examples, 4 seconds to 8 seconds, in some examples, 5 seconds to 7 seconds, in some examples, 5 seconds to 6 seconds.

In some examples, the curable silicone release formulation passes the irradiation source, for example, at a speed of 1 m/min or more, in some examples, 2 m/min or more, in some examples, 3 m/min or more, in some examples, 4 m/min or more, in some examples, 5 m/min or more, in some examples, 6 m/min or more, in some examples, 7 m/min or more, in some examples, 8 m/min or more, in some examples, 9 m/min or more, in some examples, 10 m/min or more. In some examples, the curable silicone release formulation passes the irradiation source at a speed of 10 m/min or less, in some examples, 9 m/min or less, in some examples, 8 m/min or less, in some examples, 7 m/min or less, in some examples, 6 m/min or less, in some examples, 5 m/min or less, in some examples, 4 m/min or less, in some examples, 3 m/min or less, in some examples, 2 m/min or less, in some examples, 1 m/min or less. In some examples, the curable silicone release formulation passes the irradiation source at a speed of 1 m/min to 10 m/min, in some examples, 2 m/min to 9 m/min, in some examples, 2 m/min to 8 m/min, in some examples, 3 m/min to 7 m/min, in some examples, 4 m/min to 6 m/min, in some examples, 5 m/min to 6 m/min.

In some examples, the irradiation source is an LED UV lamp, a Hg UV lamp, a Xenon arc lamp, or a microwave UV lamp. In some examples, the Xenon arc lamp. It is also possible to use other sources that emit irradiation.

In some examples, after irradiating with irradiation, the intermediate transfer member is left at room temperature to ensure full curing of the curable silicone release layer prior to use in a digital offset printing apparatus. In some examples, after irradiating with irradiation, the intermediate transfer member is left at room temperature for 24 hours under ambient light to ensure full curing of the curable silicone release layer prior to use in a digital offset printing apparatus.

In some examples, curing the curable silicone release formulation comprises irradiating the curable silicone release layer with light and then heating the curable silicone release formulation. In some examples, after irradiating with irradiation, the intermediate transfer member is heated to ensure full curing of the curable silicone release layer. In some examples, heating of the ITM involves heating at greater than room temperature for example, heating at a temperature of about 40° C. or greater, about 50° C. or greater, about 60° C. or greater, about 80° C. or greater, about 100° C. or greater, for example about 120° C. In some examples, heating of the ITM involves heating at a temperature greater than room temperature to about 200° C., for example from about 40° C. to about 150° C. In some examples, the ITM is heated for at least 1 hour, for example, about 2 hours.

In some examples, curing of the curable silicone release formulation comprise heating the curable silicone release formulation. In some examples, heating involves heating at greater than room temperature, for example, heating at a temperature of about 40° C. or greater, about 50° C. or greater, about 60° C. or greater, about 80° C. or greater, about 100° C. or greater, for example about 120° C. In some examples, heating involves heating at a temperature of from greater than room temperature to about 200° C., for example, from about 40° C. to about 190° C., about 50° C. to about 180° C., about 60° C. to about 170° C., about 70° C. to about 160° C., about 80° C. to about 150° C., about 90° C. to about 140° C., about 100° C. to about 130° C., or about 110° C. to about 120° C. In some examples, the heating is for at least 1 hour, for example, at least 1.5 hours, or at least 2 hours.

In some examples, the curable silicone release formulation is applied onto the ITM body, in some examples, onto the primer layer, for example, the second primer layer, with a layer thickness of 1 µm or more, for example, 1.5 µm or more, for example, 2 µm or more, for example, 3 µm or more, for example, 4 µm or more, for example, 5 µm or more, for example, 6 µm or more, for example, 7 µm or more, for example, 8 µm or more, for example, 9 µm or more, for example, 10 µm or more, for example, 11 µm or more, for example, 12 µm or more, for example, 13 µm or more, for example, 14 µm or more, for example, about 15 µm. In some examples, the curable silicone release formulation is applied onto the ITM body, in some examples, onto the primer layer, for example, the second primer layer, with a layer thickness of 15 µm or less, for example, 14 µm or less, for example, 13 µm or less, for example, 12 µm or less, for example, 11 µm or less, for example, 10 µm or less, for example, 9 µm or less, for example, 8 µm or less, for example, 7 µm or less, for example, 6 µm or less, for example, 5 µm or less, for example, 4 µm or less, for example, 3 µm or less, for example, 2 µm or less, for example, 1.5 µm or less, for example, about 1 µm. For example, the curable silicone release formulation is applied onto the ITM body, in some examples, onto the primer layer, for example, the second primer layer, with a layer thickness of from 1 µm to 15 µm, for example, of from 1.5 µm to 12 µm, for example, of from 3 µm to 10 µm, for example, of from 5 µm to 9 µm.

Accordingly, there is also provided a digital offset printing apparatus comprising an intermediate transfer member, the intermediate transfer member comprising a cured silicone release layer comprising a cured curable silicone release formulation, the curable silicone release formulation comprising:
  a polyalkylsiloxane containing at least two vinyl groups having a weight average molecular weight of 60,000 g/mol or less (for example, a mixture comprising a polyalkylsiloxane containing two vinyl groups having a weight average molecular weight of 30,000 g/mol or less and a polyalkylsiloxane containing at least three vinyl groups having a weight average molecular weight of 35,000 g/mol to 55,000 g/mol);
  a polyalkylsiloxane containing two vinyl groups having a weight average molecular weight of at least 65,000 g/mol;
  a polyalkylsiloxane cross-linker containing at least two Si—H bonds; and
  a catalyst or a photoinitiator.

Accordingly, there is also provided a digital offset printing apparatus comprising an intermediate transfer member, the intermediate transfer member comprising a cured silicone release layer formed by curing a curable silicone release formulation comprising:
  a vinyl-terminated polalkylsiloxane having the following formula:

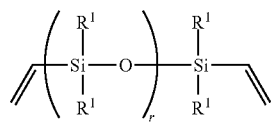

wherein
  each $R^1$ is independently selected from C1 to C6 alkyl; and
  r is an integer such that the weight average molecular weight of the polyalkylsiloxane is at least 65,000 g/mol;
  a vinyl-terminated polyalkylsiloxane having the following formula:

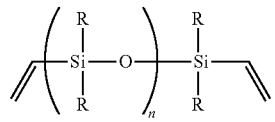

wherein
  each R is independently selected from C1 to C6 alkyl; and
  n is an integer such that the weight average molecular weight of the polyalkylsiloxane is 60,000 g/mol or less, for example, 30,000 g/mol or less;
  a pendent vinyl polyalkylsiloxane having the following formula:

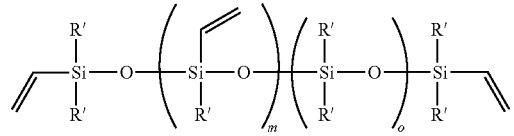

wherein
  each R' is independently selected from C1 to C6 alkyl;
  m is 1 or more;
  is 0 or more; and
  (m+o) is an integer such that the weight average molecular weight of the polyalkylsiloxane is 60,000 g/mol or less, for example, from 35,000 g/mol to 55,000 g/mol;
  a polyalkylsiloxane cross-linker having the following formula:

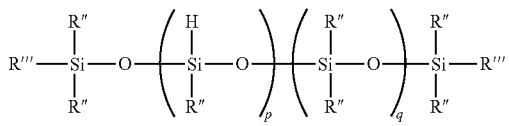

wherein
each R″ is independently selected from C1 to C6 alkyl;
each R‴ is independently selected from H and C1 to C6 alkyl;
p is 2 or more; and
q is 0 or more; and
a catalyst or photoinitiator.

The digital offset printing apparatus may further comprise one or more print stations or printheads, a primer station and a radiation source, and be adapted, in use, to apply a primer to the intermediate transfer member; jet a radiation curable inkjet ink onto the primer to form a print image on the intermediate transfer member; and irradiate the image and primer to at least partially cure the radiation curable inkjet ink and the primer on the intermediate transfer member, and transferring the print image to a print substrate.

Accordingly, there is also provided a method of digital offset printing on a printing apparatus comprising an intermediate transfer member, the intermediate transfer member comprising a cured silicone release layer formed by curing a curable silicone release formulation comprising
a polyalkylsiloxane containing at least two vinyl groups having a weight average molecular weight of 60,000 g/mol or less (for example, a mixture comprising a polyalkylsiloxane containing two vinyl groups having a weight average molecular weight of 30,000 g/mol or less and a polyalkylsiloxane containing at least three vinyl groups having a weight average molecular weight of 35,000 g/mol to 55,000 g/mol);
a polyalkylsiloxane containing two vinyl groups having a weight average molecular weight of at least 65,000 g/mol;
a polyalkylsiloxane cross-linker containing at least two Si—H bonds; and
a catalyst or a photoinitiator;
the printing method comprising generating on the intermediate transfer member a print image, and transferring the print image from the intermediate transfer member to a print substrate.

Accordingly, there is also provided a method of digital offset printing on a printing apparatus comprising an intermediate transfer member, the intermediate transfer member comprising a cured silicone release layer formed by curing a curable silicone release formulation comprising:
a vinyl-terminated polalkylsiloxane having the following formula:

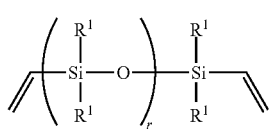

wherein
each $R^1$ is independently selected from C1 to C6 alkyl; and
r is an integer such that the weight average molecular weight of the polyalkylsiloxane is at least 65,000 g/mol;
a vinyl-terminated polyalkylsiloxane having the following formula:

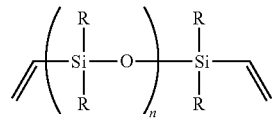

wherein
each R is independently selected from C1 to C6 alkyl; and
n is an integer such that the weight average molecular weight of the polyalkylsiloxane is 60,000 g/mol or less, for example, 30,000 g/mol or less;
a pendent vinyl polyalkylsiloxane having the following formula:

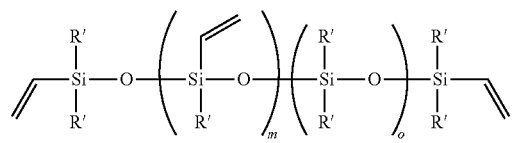

wherein
each R' is independently selected from C1 to C6 alkyl;
m is 1 or more;
is 0 or more; and
(m+o) is an integer such that the weight average molecular weight of the polyalkylsiloxane is 60,000 g/mol or less, for example, from 35,000 g/mol to 55,000 g/mol;
a polyalkylsiloxane cross-linker having the following formula:

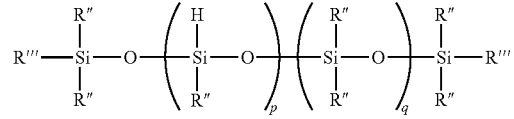

wherein
each R″ is independently selected from C1 to C6 alkyl;
each R‴ is independently selected from H and C1 to C6 alkyl;
p is 2 or more; and
q is 0 or more; and
a catalyst or photoinitiator;
the printing method comprising generating on the intermediate transfer member a print image, and transferring the print image from the intermediate transfer member to a print substrate.

In some examples, the step of generating on the intermediate transfer member a print image comprises printing an ink composition onto a photo-imaging cylinder to generate a developed toner image or print image and transferring the developed toner image or print image onto the intermediate transfer member. In some examples, the step of generating on the intermediate transfer member a print image comprises printing an ink composition directly onto the intermediate transfer member to generate a developed toner image or print image. In some examples, the ink composition is a liquid electrophotographic ink composition or an inkjet ink composition. In other words, the method of digital offset printing may be a liquid electrophotographic printing method using a liquid electrophotographic ink composition, or a transfer inkjet printing method using an inkjet ink composition.

In some examples, the developed toner or print image is at least partially dried and fused on the intermediate transfer member. The drying and fusing step may be facilitated by heating of the intermediate transfer member and/or a stream of heated air directed to the surface of the intermediate transfer member having the developed toner image thereon. As a final step, the dried and fused print image is transferred to a print substrate. Any suitable substrate may be used, and may comprise a paper substrate, a paperboard substrate, a polymer film or a metallized version of the aforementioned substrates.

EXAMPLES

The following illustrates examples of the methods and other aspects described herein. Thus, these Examples should not be considered as limitations of the present disclosure, but are merely in place to teach how to make examples of the present disclosure.

Materials

Primer G [(3-Glycidoxypropyl)trimethoxysilane; available from ABCR GmbH]:

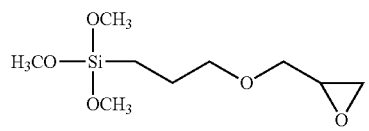 [SMILES: CO[Si](CCCOCC1CO1)(OC)OC]

V3E (vinyltrimethoxysilane; available from ABCR GmbH):

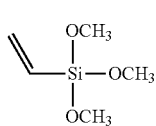

Tyzor AA-75 (75 wt. % in isopropanol; available from Dorf-Ketal)

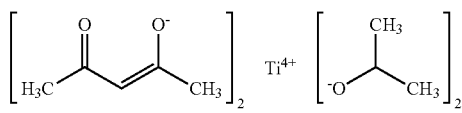

Karstedt's catalyst (platinum divinyl tetramethyl disiloxane complex: ≈10 wt. % in xylene; purchased from Johnson Matthey and used as received) or a 0.5 wt. % platinum in isopropanol; available from ABCR):

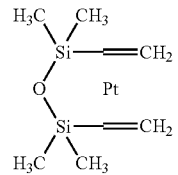

Polymer VS500 (vinyl-terminated polydimethylsiloxane with a weight average molecular weight of about 17,200 g/mol, a dynamic viscosity of about 500 mPa·s, and a vinyl content of 0.14 mmol/g; available from Evonik Hanse GmbH):

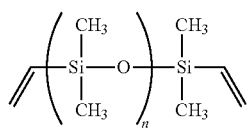

Polymer VS1,00000 (vinyl-terminated polydimethylsiloxane with a weight average molecular weight of about 140,000 g/mol, a dynamic viscosity of 100,000 mPa·s, and a vinyl content of about 0.02 mmol/g; available from Evonik):

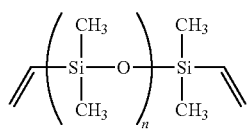

Polymer RV 5,000 (pendent vinyl polydimethylsiloxane with a weight average molecular weight of about 49,500 g/mol, a dynamic viscosity of 3,000 mPa·s and a vinyl content of about 0.4 mmol/g; available from Evonik Hanse GMBH):

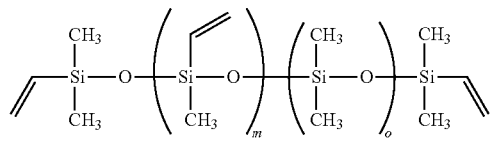

in which m is 1 or more and o is 0 or more

Cross-linker 210 (CL210; a polydimethylsiloxane containing at least two Si—H bonds; available from Evonik Hanse GmbH):

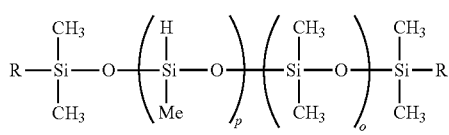

in which R=H or Me, p is 2 or more; and q is 0 or more.

Inhibitor 600 (an alkinol in Polymer VS; available from Evonik Hanse GmbH).

Carbon Black: Ketjenblack® EC600JD from AkzoNobel.

Isopropanol (a diluting solvent)

Comparative Example 1—Curable Silicone Release Formulation with 0 wt. % Polymer VS1,00000

A vinyl-terminated polydimethylsiloxane with a weight average molecular weight of about 17,200 g/mol (polymer VS500; vinyl content: 0.14 mmol/g, viscosity: 500 mPa·s, 800 g, 80 wt. % of the total amount of vinyl-containing polydimethylsiloxane, 92.01 mol % of the total amount of vinyl-containing polydimethylsiloxane) was mixed with a pendent vinyl polydimethylsiloxane with a weight average molecular weight of about 49,500 g/mol (polymer RV5,000; vinyl content: 0.4 mmol/g, dynamic viscosity: 3,000 mPa·s, 200 g, 20 wt. % of the total amount of vinyl-containing polydimethylsiloxane, 7.99 mol % of the total amount of vinyl-containing polydimethylsiloxane). To this was added conductive particles (carbon black, 10 g) and the mixture was homogenized at a shear rate of 6,000 rpm over 6 minutes by using a high-shear mixer. After homogenization, a polydimethylsiloxane cross-linker containing at least two Si—H bonds (Cross-linker 210; 100 g) was added. Inhibitor 600 (50 g) was then added, followed by a thermally activated platinum catalyst (Karstedt's catalyst at 0.5 wt. % in IPA, 5 g). Finally, the mixture was homogenized at 6,000 rpm for 2 minutes. Table 1 summarizes the described formulation.

Examples 2-5

These Examples describe the preparation of release formulations in the presence of Polymer VS1,00000 in increasing concentrations. It should be noted that the amount of the cross-linker, Inhibitor, catalyst and carbon black was kept constant. The weight ratio of Polymer VS500 to Polymer RV5,000 was also kept constant at a ratio of 4:1; however, the absolute concentration of Polymer VS500 and Polymer RV5,000 decreased to allow the increasing amounts of Polymer VS1,00000 to be incorporated into the formulation.

Example 2—Curable Silicone Release Formulation with 10 wt. % of Polymer VS1,00000

A vinyl-terminated polydimethylsiloxane with a weight average molecular weight of about 17,200 g/mol (polymer VS500; vinyl content: 0.14 mmol/g, dynamic viscosity: 500 mPa·s, 720 g, 72 wt. % of the total amount of vinyl-containing polydimethylsiloxane, 90.59 mol % of the total amount of vinyl-containing polydimethylsiloxane) was mixed with a pendent vinyl polydimethylsiloxane with a weight average molecular weight of about 49,500 g/mol, (polymer RV5,000; vinyl content: 0.4 mmol/g, dynamic viscosity: 3,000 mPa·s; 180 g, 18 wt. % of the total amount of vinyl-containing polydimethylsiloxane) and a vinyl-terminated polydimethylsiloxane with a weight average molecular weight of about 140,000 g/mol (Polymer VS1,00000; vinyl content: 0.02 mmol/g, dynamic viscosity: 100,000 mPa·s; 100 g, 10 wt. % of the total amount of vinyl-containing polydimethylsiloxane, 1.55 mol % of the total amount of vinyl-containing polydimethylsiloxane). To this was added conductive particles (carbon black; 10 g) and the mixture was homogenized at a shear rate of 6,000 rpm over 6 minutes by using a high-shear mixer. After homogenization, a polydimethylsiloxane cross-linker containing at least two Si—H bonds (Cross-linker 210; 100 g) was added. Inhibitor 600 (50 g) was then added, followed by a thermally activated platinum catalyst (Karstedt's catalyst at 0.5 wt. % in IPA). Finally, the mixture was homogenized at 6,000 rpm for 2 minutes.

Example 3—Curable Silicone Release Formulation with 20 wt. % of Polymer VS1,00000

A vinyl-terminated polydimethylsiloxane with a weight average molecular weight of 17,200 g/mol (polymer VS500; vinyl content: 0.14 mmol/g, dynamic viscosity: 500 mPa·s, 640 g, 64 wt. % of the total amount of vinyl-containing polydimethylsiloxane, 88.87 mol % of the total amount of vinyl-containing polydimethylsiloxane) was mixed with a pendant vinyl polydimethylsiloxane with a weight average molecular weight of 49,500 g/mol (polymer RV5,000; vinyl content: 0.4 mmol/g, dynamic viscosity: 3,000 mPa·s; 160 g, 16 wt. % of the total amount of vinyl-containing polydimethylsiloxane, 7.72 mol % of the total amount of vinyl-containing polydimethylsiloxane) and a vinyl-terminated polydimethylsiloxane with a weight average molecular weight of 140,000 g/mol (Polymer VS1,00000, vinyl content: 0.02 mmol/g, dynamic viscosity: 100,000 mPa·s; 200 g, 20 wt. % of the total amount of vinyl-containing polydimethylsiloxane, 3.41 mol % of the total amount of vinyl-containing polydimethylsiloxane). To this was added conductive particles (carbon black; 10 g) and the mixture was homogenized at a shear rate of 6,000 rpm over 6 minutes by using a high-shear mixer. After homogenization, a polydimethylsiloxane cross-linker containing at least two Si—H bonds (Cross-linker 210; 100 g) was added. Inhibitor 600 (50 g) was then added, followed by a thermally activated platinum catalyst (Karstedt's catalyst at 0.5 wt. % in IPA). Finally, the mixture was homogenized at 6,000 rpm for 2 minutes.

Example 4—Curable Silicone Release Formulation with 30 wt. % of Polymer VS1,00000

A vinyl-terminated polydimethylsiloxane with a weight average molecular weight of about 17,200 g/mol (polymer VS500; vinyl content: 0.14 mmol/g, dynamic viscosity: 500 mPa·s, 560 g, 56 wt. % of the total amount of vinyl-containing polydimethylsiloxane, 7.54 mol % of the total amount of vinyl-containing polydimethylsiloxane) was mixed with a pendant vinyl polydimethylsiloxane with a weight average molecular weight of 49,500 g/mol (polymer RV5,000; vinyl content: 0.4 mmol/g, dynamic viscosity: 3,000 mPa·s; 140 g, 14 wt. % of the total amount of vinyl-containing polydimethylsiloxane, 7.54 mol % of the total amount of vinyl-containing polydimethylsiloxane) and a vinyl-terminated polydimethylsiloxane with a weight average molecular weight of about 140,000 g/mol (Polymer VS1,00000, vinyl content: 0.02 mmol/g, dynamic viscosity: 100,000 mPa·s, 300 g, 30 wt. % of the total amount of vinyl-containing polydimethylsiloxane, 5.71 mol % of the total amount of vinyl-containing polydimethylsiloxane). To this was added conductive particles (carbon black; 10 g) and the mixture was homogenized at a shear rate of 6,000 rpm over 6 minutes by using a high-shear mixer. After homogenization, a polydimethylsiloxane cross-linker containing at least two Si—H bonds (Cross-linker 210; 100 g) was added. Inhibitor 600 (50 g) was then added, followed by a thermally activated platinum catalyst (Karstedt's catalyst at 0.5 wt. % in IPA). Finally, the mixture was homogenized at 6,000 rpm for 2 minutes.

Example 5—Curable Silicone Release Formulation with 40 wt. % of Polymer VS1,00000

A vinyl-terminated polydimethylsiloxane with a weight average molecular weight of about 17,200 g/mol (polymer VS500; vinyl content: 0.14 mmol/g, dynamic viscosity: 500 mPa·s, 480 g, 48 wt. % of the total amount of vinyl-containing polydimethylsiloxane, 84.09 mol % of the total amount of vinyl-containing polydimethylsiloxane) was mixed with a pendant vinyl polydimethylsiloxane with a weight average molecular weight of about 49,500 g/mol (polymer RV5,000; vinyl content: 0.4 mmol/g, dynamic viscosity: 3,000 mPa·s, 120 g, 12 wt. % of the total amount of vinyl-containing polydimethylsiloxane, 7.30 mol % of the total amount of vinyl-containing polydimethylsiloxane) and a vinyl-terminated polydimethylsiloxane with a weight average molecular weight of about 140,000 g/mol (Polymer VS1,00000, vinyl content: 0.02 mmol/g, dynamic viscosity: 100,000 mPa·s, 400 g, 40 wt. % of the total amount of vinyl-containing polydimethylsiloxane, 8.61 mol % of the total amount of vinyl-containing polydimethylsiloxane). To this was added conductive particles (carbon black; 10 g) and the mixture was homogenized at a shear rate of 6,000 rpm over 6 minutes by using a high-shear mixer. After homogenization, a polydimethylsiloxane cross-linker containing at least two Si—H bonds (Cross-linker 210; 100 g) was added. Inhibitor 600 (50 g) was then added, followed by a thermally activated platinum catalyst (Karstedt's catalyst at 0.5 wt. % in IPA). Finally, the mixture was homogenized at 6,000 rpm for 2 minutes.

mine its swollen weight. The bulk swelling capacity (%) is defined by the following formula:

$$\frac{\text{swollen weight} - \text{dry weight}}{\text{dry weight}} \times 100$$

Bulk swelling capacity as a result of the addition of VS1,00000 (a vinyl-terminated polydimethylsiloxane with a weight average molecular weight of 140,000 g/mol) to the silicone release formulation was tested (Example 2 to 5) and compared to the standard silicone release formulation (Comparative Example 1). A significant increase in the bulk swelling of the silicone formulation was recorded, from 112 wt. % in the reference composition (Comparative Example 1), up to 125-140% in the presence of increasing amounts of VS1,00000 (see Table 2). Without wishing to be bound by theory, it is thought that short and medium chain length polyalkylsiloxane compounds are brittle components that supply higher hardness (Shore A) and Young's modulus, whereas long chain components with higher weight average molecular weight (e.g., at least 65,000 g/mol) supply higher volume with lower packing density and more voids, hence increased swelling with Isopar L. Although a low molar concentration of the high weight average molecular weight polyalkylsiloxane is present, this long chain polymer dominates the volume of the system. Bearing in mind that polyalkylsiloxane cross-linker (CL210) content remained unchanged, the increase in the swelling cannot be attributed

TABLE 1

Example and comparative example curable silicone release formulations

| | Comp. Ex. 1 | | Ex. 2 | | Ex. 3 | | Ex. 4 | | Ex. 5 | |
|---|---|---|---|---|---|---|---|---|---|---|
| | g | mol % | g | mol % | g | mol % | g | mol % | g | mol % |
| VS1,00000 ($M_w$ 140,000 g/mol) | 0 | 0 | 100 | 1.55 | 640 | 3.41 | 560 | 5.71 | 480 | 8.61 |
| VS500 ($M_w$ 17,200 g/mol) | 800 | 92.01 | 720 | 92.01 | 160 | 88.87 | 140 | 86.75 | 120 | 84.09 |
| RV 5,000 ($M_w$ 49,500 g/mol) | 200 | 7.99 | 180 | 7.99 | 200 | 7.72 | 300 | 7.54 | 400 | 7.30 |
| CL210 | 100 | — | 100 | — | 100 | — | 100 | — | 100 | — |
| Inhibitor 600 | 50 | — | 50 | — | 50 | — | 50 | — | 50 | — |
| Karstedt solution (0.5 wt. % Pt) | 5 | — | 5 | — | 5 | — | 5 | — | 5 | — |
| Ketjenblack™ EC600JD | 10 | — | 10 | — | 10 | — | 10 | — | 10 | — |

Bulk Layer Formation for Swelling Capacity and Hardness Tests

The curable silicone release compositions (50 g) of each of Comparative Example 1 and Examples 2-5 was placed on an aluminium plate and the coated aluminium plates were placed in an oven at 120° C. for 1.5 hours to obtain dry bulk (cured) material for Isopar L swelling and harness tests.

The "bulk swelling capacity" was determined according to the following test. A dry (cured) film with a thickness of between 1 and 3 mm was initially weighed to determine the dry weight of the film. The dry film was then immersed in solvent (Isopar® L) in a sealed container. After 20 hours at 100° C., the film was cooled and removed from the solvent with excess solvent blotted with a clean dry cloth. The swollen film (swollen with solvent) was weighed to deterto the very low decrease in the total vinyl content (see Table 2) of the formulations upon incorporation of VS1,00000 into the formulation. Thus, the number of cross-linking sites was not dramatically changed.

The Shore A hardness value is measured by using ASTM D-2240, DIN ISO 7619-1 (3s) or ISO 868. As shown in Table 2, a very moderate decrease in Shore A hardness was measured on incorporation of VS1,00000 (minimum value of 33 Shore A at maximum amount of VS1,00000).

Again, it should be noted that cross-linker content remains constant to ensure mechanical stability on the printing press by providing enough cross-linking sites in the formulation. At the same time, the decrease in the total vinyl content of the formulations upon incorporation of VS1,00000 is very low (as shown in Table 2)—decreasing from 0.160 mmol/g to 0.149 mmol/g (taking into account the high weight average molecular weight of VS1,00000), ensuring that enough cross-linking sites remain in the curable silicone formulation. Hence, it should be noted that the hardness decreased only to the range of 33-37 Shore A, which still provides acceptable hardness for the mechanical consistency of the silicone release layer on the printing press, without compromising print quality (print quality problems may start to appear when the Shore A hardness drops below 30). A low content (in mol %) of the higher weight average molecular weight (at least 65,000 g/mol) component preserves the mechanical stability of the system. Together with increased swelling in Isopar L from 110 wt. % to 130-145 wt. %, the Example silicone release formulations are excellent candidates for enhanced transferability on the printing press.

TABLE 2

Bulk swelling with Isopar L and hardness of different silicone release formulations comprising VS1,00000 ($M_w$ 140,000)

|  | Amount of VS1,00000 | | Swelling in Isopar L | Shore A | Total vinyl content | Ratio hydride |
|---|---|---|---|---|---|---|
|  | [wt. %] | [mol %] | [wt. %] | Hardness | [mmol/g] | to vinyl |
| Comp. Ex.1 | 0 | 0 | 110 | 40 | 0.160 | 2.18 |
| Ex.2 | 10 | 1.55 | 125 | 37 | 0.158 | 2.4 |
| Ex. 3 | 20 | 3.41 | 126 | 35 | 0.156 | 2.67 |
| Ex.4 | 30 | 5.71 | 130 | 34 | 0.153 | 2.99 |
| Ex. 5 | 40 | 8.61 | 140 | 33 | 0.149 | 3.4 |

Release Layer Formation from a Curable Silicone Release Composition

Comparative Example 6—Formation of the Cured Silicone Release Layer from Comparative Example 1 Formulation The curable silicone release formulation of Comparative Example 1 was applied by gravure coating onto an supportive portion of an ITM to form ITM having the following structure (in order from the base layer (layer 1) to the top layer (layer 6)):
1. Fabric layer.
2. Rubber-based compressible layer (a nitrile rubber (NBR) from ContiTech AG Vahrenwalder Str. 9 30165 Hannover Germany).
3. Rubber-based conductive layer (a nitrile rubber (NBR) from ContiTech)
4. Rubber-based soft compliance layer (an alkyl acrylate copolymer (ACM) from TC (Transcontinental, UK))
5. Primer layer (gravure coated onto the soft compliance layer (layer 4) and formed layer by layer). The primer formulation is described in Table 3.
6. Curable silicone release formulation composition as described in Comparative Example 1.

TABLE 3

Primer formulation—The primer composition was prepared by mixing an epoxysilane, a vinyl silane, a first catalyst, a second catalyst and a trisiloxane surfactant in the proportions given below.

|  |  | Supplier | Amount [wt. %] |
|---|---|---|---|
| Epoxysilane | Primer G | ABCR | 52 |
| Vinyl silane | V3M | ABCR | 35 |

TABLE 3-continued

Primer formulation—The primer composition was prepared by mixing an epoxysilane, a vinyl silane, a first catalyst, a second catalyst and a trisiloxane surfactant in the proportions given below.

|  |  | Supplier | Amount [wt. %] |
|---|---|---|---|
| First catalyst | Tyzor AA75 | Dorf Ketal | 10 |
| Second catalyst | Karstedt solution (9 wt. % Pt) | Johnson Matthey | 3 |

The primer was applied to the (partially cured) soft compliance layer (layer 4) by using a gravure coater with a gravure volume of 10.5 cm$^3$/m$^2$ at a coating speed of 5 m/min. Immediately thereafter, the curable silicone release formulation having the composition shown in Comparative Example 1 was applied to the layer of the primer by using a gravure coater with a gravure volume of 13.8 cm$^3$/m$^2$ at a coating speed of 5 m/min. After the coating process was complete, the soft compliance layer, the primer layer and the curable silicone release formulation were then thermally cured by placing the entire ITM in an oven at 120° C. for 1.5 hours.

Example 7

The procedure of Example 6 was repeated, except that the curable silicone release formulation of Example 2 was used to form the cured silicone release layer.

Example 8

The procedure of Example 6 was repeated, except that the curable silicone release formulation of Example 3 was used to form the cured silicone release layer.

Example 9

The procedure of Example 6 was repeated, except that the curable silicone release formulation of Example 4 was used to form the cured silicone release layer.

Example 10

The procedure of Example 6 was repeated, except that the curable silicone release formulation of Example 5 was used to form the cured silicone release layer.

Contact Angle and Surface Free Energy Tests

The mean contact angles (water and diiodomethane ($CH_2I_2$)) and surface free energy of the prepared release layers containing high weight average molecular weight (of at least 65,000 g/mol) polyalkylsiloxane (Examples 7-10) were measured and compared with those for the cured silicone release layer according to Comparative Example 6. The mean contact angle was measured by using a mobile surface analyser (produced by Kruss Company). The water and diiodomethane contact angles were measured at room temperature (about 25° C.). At least three measurements were taken for every surface and the mean values were determined. The surface free energy was calculated by using the Owens-Wendt-Rabel-Kaelble algorithm, which is available in the Kruss Company software supplied with the mobile surface analyser.

TABLE 4

Mean contact angle and surface free energy of cured silicone release layers on the intermediate transfer members

| | Amount of VS1,00000 [wt. %] | Mean contact angle [°] Water | CH$_2$I$_2$ | Surface free energy [mN/m] |
|---|---|---|---|---|
| Comp. Ex. 6 | 0 | 109.9 (±0.8) | 81.9 (±1.1) | 17.0 (±0.7) |
| Ex. 7 | 10 | 111.1 (±1.7) | 100.1 (±1.0) | 10.4 (±0.7) |
| Ex. 8 | 20 | 111.4 (±1.4) | 103.8 (±2.3) | 9.5 (±1.2) |
| Ex. 9 | 30 | 111.5 (±1.9) | 93.6 (±2.4) | 12.2 (±1.0) |
| Ex. 10 | 40 | 111.5 ((±2.6) | 93.8 (±2.0) | 12.2 (±1.1) |

Table 4 reveals that higher diiodomethane contact angles and therefore lower surface free energies were obtained upon incorporation of the high weight average molecular weight polyalkylsiloxane into the cured silicone release layer, when compared to the comparative cured silicone release layer (Comparative Example 6). A lower surface free energy of the release layer suggests that the surface has a more inert nature, which could weaken the interaction between the ink composition and the cured silicone release layer and improve the transferability of the ink composition from the intermediate transfer member to the substrate.

Printing Tests

Accelerated stress tests were performed on a liquid electrophotographic printing press to create a situation where ink is incompletely transferred from the intermediate transfer member to the substrate. More specifically, pressure was applied during the transfer of the ink from the intermediate transfer member to the substrate (the T2 transfer) to cause incomplete ink transfer from the ITM to the substrate (paper). In addition, difficult substrates such as Soproset paper (uncoated smooth paper) and Century paper (uncoated and rough paper) were used to increase the stress on the ITM. Multiple copies of grey pages were printed to age the ITM and black pages were printed periodically to monitor the amount of ink transfer to the paper substrate by using the HP Indigo 7500 digital press (a liquid electrophotographic printing press) for each of the ITMs of Examples 6-10. In this way partial ink transfer from the ITM to the paper substrate and gradual accumulation on the ITM surface (the cured silicone release layer) were induced in all ITMs relatively quickly. Comparative tests between the Comparative Example 6 ITM and the Example 7 to 10 ITMs containing the high weight average molecular weight polymers were conducted, by visually assessing the appearance of the black monitor pages. Consequently, images with more complete black colour with fewer white spots (paper) visible were regarded as better. A clear advantage was seen for ITMs incorporating the high weight average molecular weight polyalkylsiloxane in the cured silicone release layer (Examples 7-10) compared with the Comparative ITM (Comparative Example 6). Moreover, the ITM of Example 10, with the highest amount of high weight average molecular weight polyalkylsiloxane, showed the greatest improvement in the properties.

Paper Specifications

Fedrigoni Centuty Nuttuno: 215 g/m$^2$, 320 mm×464 mm, 330 µm thickness Soproset paper: 120 g/m$^2$, 320 mm×464 mm, 160 µm thickness Other Curable Silicone Release Formulations Tested In addition to the curable silicone release formulations described in Examples 2 to 5 and the cured silicone release layers described in Examples 7 to 10, other polyalkylsiloxanes containing at least two vinyl groups having a weight average molecular weight of at least 65,000 g/mol have been tested. Similar experimental results were seen for curable silicone release formulations prepared as described in Examples 2 to 5 in which the vinyl-terminated polydimethylsiloxane with a weight average molecular weight of about 140,000 g/mol (polymer VS100,000) was replaced with polymer VS20,000, VS65,000 or VS165,000 (all available from Evonik). The best results were shown for Polymer VS100,000. Each of these polymers is a vinyl-terminated polydimethylsiloxane with a weight average molecular weight in the range of from 70,000 g/mol to 155,000 g/mol, a dynamic viscosity in the range of 20,000 to 165,000 mPa·s and a vinyl content in the range of 0.04 mmol/g to 0.015 mmol/g.

While the invention has been described with reference to certain examples, those skilled in the art will appreciate that various modifications, changes, omissions, and substitutions can be made without departing from the spirit of the disclosure. It is intended, therefore, that the invention be limited by the scope of the following claims. Unless otherwise stated, the features of any dependent claim can be combined with the features of any of the other dependent claims and any of the independent claims.

The invention claimed is:

1. An intermediate transfer member for digital offset printing, comprising:
   a cured silicone release layer formed by curing a curable silicone release formulation comprising:
      a polyalkylsiloxane containing at least two vinyl groups having a weight average molecular weight of 60,000 g/mol or less;
      a polyalkylsiloxane containing two vinyl groups having a weight average molecular weight of at least 65,000 g/mol;
      a polyalkylsiloxane cross-linker containing at least two Si—H bonds; and
      a catalyst or a photoinitiator.

2. The intermediate transfer member according to claim 1, wherein the polyalkylsiloxane containing two vinyl groups having a weight average molecular weight of at least 65,000 g/mol has a weight average molecular weight of from 65,000 to about 170,000 g/mol.

3. The intermediate transfer member according to claim 1, wherein the polyalkylsiloxane containing two vinyl groups having a weight average molecular weight of at least 65,000 g/mol has a weight average molecular weight of from 70,000 to about 155,000 g/mol.

4. The intermediate transfer member according to claim 1, wherein the polyalkylsiloxane containing two vinyl groups having a weight average molecular weight of at least 65,000 g/mol comprises a vinyl-terminated polyalkylsiloxane having the following formula:

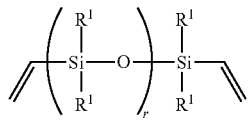

wherein
   each R$^1$ is independently selected from C1 to C6 alkyl; and
   r is an integer that provides the vinyl-terminated polyalkylsiloxane with a weight average molecular weight of at least 65,000 g/mol.

5. The intermediate transfer member according to claim 1, wherein the polyalkylsiloxane comprising two vinyl groups having a weight average molecular weight of at least 65,000 g/mol is present in an amount of up to about 10 mol % based on the total number of moles of vinyl-containing polyalkylsiloxane compounds.

6. The intermediate transfer member according to claim 1, wherein the polyalkylsiloxane comprising two vinyl groups having a weight average molecular weight of at least 65,000 g/mol is present in an amount of from about 0.5 mol % to about 10 mol % based on the total number of moles of vinyl-containing polyalkylsiloxane compounds.

7. The intermediate transfer member according to claim 1, wherein the polyalkylsiloxane containing at least two vinyl groups having a weight average molecular weight of 60,000 g/mol or less comprises a polyalkylsiloxane containing two vinyl groups having a weight average molecular weight of 30,000 g/mol or less.

8. The intermediate transfer member according to claim 7, wherein the polyalkylsiloxane containing two vinyl groups having a weight average molecular weight of 30,000 g/mol or less comprises a vinyl-terminated polyalkylsiloxane having the following formula:

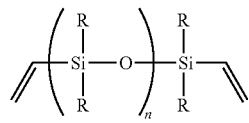

wherein
each R is independently selected from C1 to C6 alkyl; and
n is an integer that provides the vinyl-terminated polyalkylsiloxane with a weight average molecular weight of 30,000 g/mol or less.

9. The intermediate transfer member according to claim 1, wherein the polyalkylsiloxane containing at least two vinyl groups having a weight average molecular weight of 60,000 g/mol or less comprises a polyalkylsiloxane containing at least three vinyl groups having a weight average molecular weight of from about 35,000 g/mol to about 55,000 g/mol.

10. The intermediate transfer member according to claim 9, wherein the polyalkylsiloxane containing at least three vinyl groups comprises a pendent vinyl polyalkylsiloxane having the following formula:

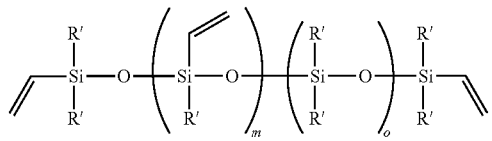

wherein
each R' is independently selected from C1 to C6 alkyl;
m is 1 or more; and
o is 0 or more; and
(m+o) is an integer that provides the pendent vinyl polyalkylsiloxane with a weight average molecular weight in the range of 35,000 g/mol to 55,000 g/mol.

11. The intermediate transfer member according to claim 1, wherein the polyalkylsiloxane containing at least two vinyl groups having a weight average molecular weight of 60,000 g/mol or less comprises a vinyl-terminated polyalkylsiloxane with a weight average molecular weight of 30,000 g/mol or less; and
a pendent vinyl polyalkylsiloxane with a weight average molecular weight of from about 35,000 g/mol to about 55,000 g/mol, wherein the vinyl-terminated polyalkylsiloxane with a weight average molecular weight of 30,000 g/mol or less has the following formula:

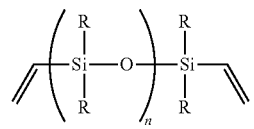

wherein
each R is independently selected from C1 to C6 alkyl; and
n is an integer that provides the vinyl-terminated polyalkylsiloxane with a weight average molecular weight of 30,000 g/mol or less; and
wherein the pendent vinyl polyalkylsiloxane with a weight average molecular weight of from about 35,000 g/mol to about 55,000 g/mol has the following formula:

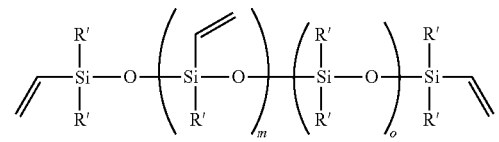

wherein
each R' is independently selected from C1 to C6 alkyl;
m is 1 or more; and
o is 0 or more; and
(m+o) is an integer that provides the pendent vinyl polyalkylsiloxane with a weight average molecular weight of from 35,000 g/mol to about 55,000 g/mol.

12. The intermediate transfer member according to claim 11, wherein the polyalkylsiloxane containing two vinyl groups having a weight average molecular weight of at least 65,000 g/mol comprises a vinyl-terminated polyalkylsiloxane having the following formula:

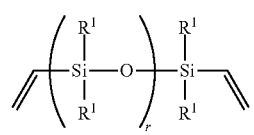

wherein
each $R^1$ is independently selected from C1 to C6 alkyl; and
r is an integer that provides the vinyl-terminated polyalkylsiloxane with a weight average molecular weight of at least 65,000 g/mol.

13. The intermediate transfer member according to claim 1, wherein the polyalkylsiloxane cross-linker containing at least two Si—H bonds comprises a polyalkylsiloxane cross-linker having the following formula:

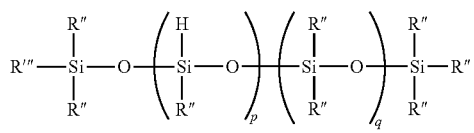

wherein each R″ is independently selected from C1 to C6 alkyl;

each R‴ is independently selected from H and C1 to C6 alkyl;

p is 2 or more; and q is 0 or more.

14. A method of producing an intermediate transfer member for digital offset printing, comprising:

applying onto an intermediate transfer member body a curable silicone release formulation;

curing the curable silicone release formulation to form a cured silicone release layer;

wherein the curable silicone release formulation comprises:
 a polyalkylsiloxane containing at least two vinyl groups having a weight average molecular weight of 60,000 g/mol or less;
 a polyalkylsiloxane containing two vinyl groups having a weight average molecular weight of at least 65,000 g/mol;
 a polyalkylsiloxane cross-linker containing at least two Si—H bonds; and
 a catalyst or a photoinitiator.

15. A curable release formulation for an intermediate transfer member of a digital offset printing apparatus, comprising:
 a polyalkylsiloxane containing at least two vinyl groups having a weight average molecular weight of 60,000 g/mol or less;
 a polyalkylsiloxane containing two vinyl groups having a weight average molecular weight of at least 65,000 g/mol;
 a polyalkylsiloxane cross-linker containing at least two Si—H bonds; and
 a catalyst or a photoinitiator.

* * * * *